United States Patent
Ajri et al.

(10) Patent No.: US 12,183,005 B2
(45) Date of Patent: *Dec. 31, 2024

(54) SYSTEM AND METHOD FOR PERFORMING QUALITY CONTROL

(71) Applicant: James R. Glidewell Dental Ceramics, Inc., Newport Beach, CA (US)

(72) Inventors: Abhishek Babasaheb Ajri, Lake Forest, CA (US); Vaheh Golestanian Nemagrdi, Orange, CA (US); Marco Antonio Jokada, Diamond Bar, CA (US); David Christopher Leeson, North Tustin, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,371

(22) Filed: Dec. 15, 2021

(65) Prior Publication Data
US 2022/0108453 A1    Apr. 7, 2022

Related U.S. Application Data

(63) Continuation of application No. 16/457,199, filed on Jun. 28, 2019, now Pat. No. 11,210,788, which is a
(Continued)

(51) Int. Cl.
*G06T 7/00* (2017.01)
*G06F 17/18* (2006.01)
(Continued)

(52) U.S. Cl.
CPC ............ *G06T 7/0014* (2013.01); *G06F 17/18* (2013.01); *G06F 30/20* (2020.01); *G06F 30/23* (2020.01);
(Continued)

(58) Field of Classification Search
CPC ........ G06T 7/0014; G06F 30/23; G06F 17/18
(Continued)

(56) References Cited

U.S. PATENT DOCUMENTS 5,273,429 A * 12/1993 Rekow .................... A61C 13/00
433/223
5,939,211 A *  8/1999 Mormann .......... A61C 13/0003
264/16

(Continued)

OTHER PUBLICATIONS

Pompa et al. ("Comparison of Conventional Methods and Laser-Assisted Rapid Prototyping for Manufacturing Fixed Dental Prostheses: An In Vitro Study", BioMed Research International, 2015, pp. 1-7). (Year: 2015).*

(Continued)

*Primary Examiner* — Iftekhar A Khan
(74) *Attorney, Agent, or Firm* — Klarquist Sparkman, LLP

(57) ABSTRACT

Disclosed are example embodiments of methods and systems for identifying and quantifying manufacturing defects of a manufactured dental prosthesis. Certain embodiments of the system for performing quality control on manufactured dental prostheses includes: a quality control module configured to determine whether the dental prosthesis is a good or a defective product based at least on a differences model generated by comparing a design model and a scanned model of the manufactured dental prosthesis.

13 Claims, 27 Drawing Sheets

Related U.S. Application Data continuation-in-part of application No. 15/928,484, filed on Mar. 22, 2018, now Pat. No. 11,120,179.

(51) Int. Cl.
   *G06F 30/20* (2020.01)
   *G06F 30/23* (2020.01)
   *G06F 113/10* (2020.01)
   *G06F 119/18* (2020.01)

(52) U.S. Cl.
   CPC ...... *G06F 2113/10* (2020.01); *G06F 2119/18* (2020.01); *G06T 2207/30052* (2013.01)

(58) Field of Classification Search
   USPC .......................................................... 703/6
   See application file for complete search history.

(56) References Cited

U.S. PATENT DOCUMENTS

| | | | | |
|---|---|---|---|---|
| 6,525,819 | B1* | 2/2003 | Delawter | G01J 3/50 433/29 |
| 7,708,560 | B2* | 5/2010 | Kraemer | A61C 13/0022 700/182 |
| 7,716,024 | B2* | 5/2010 | Hultgren | G06T 19/20 703/6 |
| 8,200,462 | B2* | 6/2012 | Marshall | A61C 13/0004 703/11 |
| 8,568,897 | B2* | 10/2013 | Ganley | A61C 13/0022 428/542.2 |
| 8,640,338 | B2* | 2/2014 | Jacquemyns | A61C 3/02 703/6 |
| 8,751,031 | B2* | 6/2014 | Sager | G16H 50/50 700/96 |
| 8,784,021 | B2* | 7/2014 | Luksch | A61C 13/0022 409/164 |
| 10,123,706 | B2* | 11/2018 | Elbaz | G06T 17/00 |
| 10,470,853 | B2* | 11/2019 | Leeson | B23Q 3/061 |
| 10,682,210 | B1* | 6/2020 | LaMar | A61C 13/0013 |
| 2002/0021439 | A1* | 2/2002 | Priestley | G01J 3/46 356/243.5 |
| 2003/0116299 | A1* | 6/2003 | Embert | A61C 9/0046 164/4.1 |
| 2004/0120781 | A1 | 6/2004 | Luca et al. | |
| 2004/0136002 | A1* | 7/2004 | Whaite | G01J 3/524 356/419 |
| 2004/0252303 | A1* | 12/2004 | Giorgianni | G01J 3/508 356/402 |
| 2005/0008887 | A1* | 1/2005 | Haymann | A61C 13/0003 428/542.8 |
| 2007/0154511 | A1* | 7/2007 | Shastri | A61L 27/50 623/1.11 |
| 2007/0154866 | A1* | 7/2007 | Hall | A61C 1/084 433/213 |
| 2007/0172396 | A1* | 7/2007 | Neeper | G01N 35/0099 422/400 |
| 2007/0190481 | A1* | 8/2007 | Schmitt | A61C 9/0046 433/68 |
| 2008/0015727 | A1* | 1/2008 | Dunne | B33Y 30/00 700/118 |
| 2008/0064008 | A1* | 3/2008 | Schmitt | A61C 7/002 382/128 |
| 2008/0228303 | A1* | 9/2008 | Schmitt | A61C 19/063 700/98 |
| 2008/0241796 | A1* | 10/2008 | Ce | A61C 13/0004 433/215 |
| 2009/0133260 | A1* | 5/2009 | Durbin | A61C 13/082 29/896.11 |
| 2009/0254299 | A1* | 10/2009 | Tarazi | A61C 13/0004 702/137 |
| 2009/0258965 | A1* | 10/2009 | Lassila | A61K 6/54 523/116 |
| 2010/0105011 | A1* | 4/2010 | Karkar | A61C 13/0004 433/215 |
| 2010/0281370 | A1* | 11/2010 | Rohaly | A61C 9/0053 715/810 |
| 2011/0010187 | A1* | 1/2011 | Andersson | A61C 1/084 705/2 |
| 2011/0050848 | A1* | 3/2011 | Rohaly | G06T 15/10 348/43 |
| 2011/0306017 | A1* | 12/2011 | Tanaka | C04B 41/85 433/203.1 |
| 2012/0308954 | A1* | 12/2012 | Dunne | A61C 13/34 700/98 |
| 2013/0174639 | A1* | 7/2013 | Earthman | G01M 7/08 367/189 |
| 2013/0289950 | A1 | 10/2013 | Kopelman | |
| 2014/0308624 | A1* | 10/2014 | Lee | A61C 13/0004 433/214 |
| 2015/0086939 | A1* | 3/2015 | Fisker | A61C 13/0022 433/29 |
| 2015/0147585 | A1* | 5/2015 | Schwarze | B29C 64/153 219/76.14 |
| 2015/0150655 | A1* | 6/2015 | Frank | A61B 6/5247 433/29 |
| 2015/0151858 | A1* | 6/2015 | Turzi | A61L 27/54 141/59 |
| 2015/0250568 | A1* | 9/2015 | Fisker | A61C 13/081 433/29 |
| 2015/0332018 | A1* | 11/2015 | Rosen | G16H 10/40 705/2 |
| 2016/0100917 | A1* | 4/2016 | Howe | A61C 13/0004 264/16 |
| 2016/0147976 | A1* | 5/2016 | Jain | G16H 20/10 705/2 |
| 2017/0000591 | A1* | 1/2017 | Guillot | A61B 5/0013 |
| 2017/0027671 | A1* | 2/2017 | Kim | G06V 20/64 |
| 2017/0156828 | A1* | 6/2017 | Leeson | B23Q 3/061 |
| 2017/0265978 | A1* | 9/2017 | Borotto | A61C 19/05 |
| 2017/0340419 | A1* | 11/2017 | Ohtake | A61C 13/0004 |
| 2017/0345147 | A1* | 11/2017 | Ohtake | G06T 7/75 |
| 2018/0028413 | A1* | 2/2018 | Craig | A61K 6/20 |
| 2018/0042708 | A1* | 2/2018 | Caron | A61C 13/2255 |
| 2018/0206951 | A1* | 7/2018 | O'Neill | A61C 9/004 |
| 2019/0126306 | A1* | 5/2019 | Bakhshaei | B05B 15/55 |
| 2019/0130596 | A1* | 5/2019 | Manafighazani | G06Q 10/087 |
| 2019/0209274 | A1* | 7/2019 | Barak | A61C 5/007 |
| 2019/0294743 | A1* | 9/2019 | Ajri | A61C 13/0004 |
| 2019/0318479 | A1* | 10/2019 | Ajri | G06F 17/18 |
| 2020/0051234 | A1 | 2/2020 | Ajiri et al. | |
| 2022/0277436 | A1 | 9/2022 | Ajri et al. | |

OTHER PUBLICATIONS

Maria Averyanova (Quality Control of Dental Bridges and Removable Prostheses Manufactured Using Phenix Systems Equipment, AEPR'12, 17th European Forum on Rapid Prototyping and Manufacturing Paris, France, Jun. 12-14, 2012) (Year: 2012).*

Pompa et al. ("Comparison of Conventional Methods and Laser-Assisted Rapid Prototyping for Manufacturing Fixed Dental Prostheses: An in Vitro Study", Biomed Research International, 2015, pp. 1-2).

Gary L. Henkel ("A Comparison of Fixed Prostheses Generated from Conventional vs. Digitally Scanned Dental Impressions", Private Practice, Horsham, Pennsylvania, 2007, pp. 1-8).

Maria Averyanova (Quality Control of Dental Bridges and Removable Prostheses Manufactured Using Phenix Systems Equipment, AEPR 12, 17th European Forum on rapid Prototyping and Manufacturing Paris, France, Jun. 12-14, 2012).

* cited by examiner

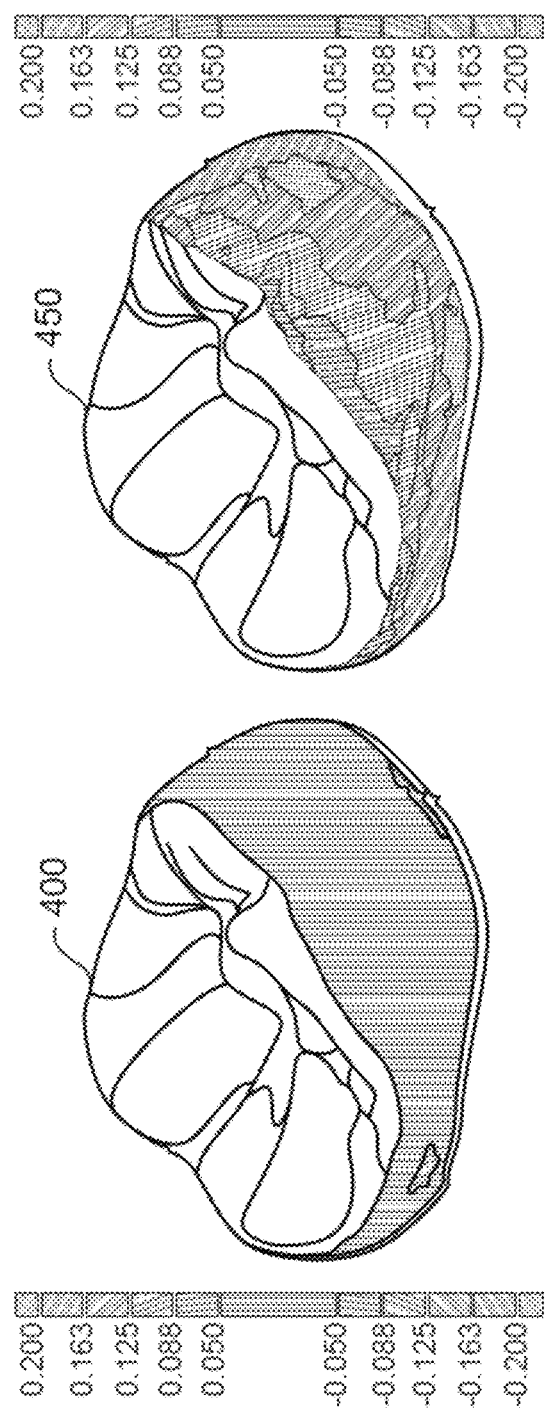

| >=Min | <Max | # Points | % |
|---|---|---|---|
| -0.200 | -0.191 | 0 | 0.000 |
| -0.191 | -0.181 | 0 | 0.000 |
| -0.181 | -0.172 | 0 | 0.000 |
| -0.172 | -0.163 | 0 | 0.000 |
| -0.163 | -0.154 | 0 | 0.000 |
| -0.154 | -0.144 | 0 | 0.000 |
| -0.144 | -0.135 | 0 | 0.000 |
| -0.135 | -0.126 | 0 | 0.000 |
| -0.126 | -0.116 | 0 | 0.000 |
| -0.116 | -0.107 | 0 | 0.000 |
| -0.107 | -0.098 | 0 | 0.000 |
| -0.098 | -0.089 | 0 | 0.000 |
| -0.089 | -0.079 | 0 | 0.000 |
| -0.079 | -0.070 | 0 | 0.000 |
| -0.070 | -0.061 | 5 | 0.011 |
| -0.061 | -0.051 | 136 | 0.311 |
| -0.051 | -0.042 | 492 | 1.126 |
| -0.042 | -0.033 | 1255 | 2.872 |
| -0.033 | -0.024 | 3046 | 6.971 |
| -0.024 | -0.014 | 5266 | 12.051 |
| -0.014 | -0.005 | 6017 | 13.770 |
| -0.005 | 0.005 | 7532 | 17.237 |
| 0.005 | 0.014 | 8113 | 18.567 |
| 0.014 | 0.024 | 6434 | 14.724 |
| 0.024 | 0.033 | 3185 | 7.289 |
| 0.033 | 0.042 | 1202 | 2.751 |
| 0.042 | 0.051 | 467 | 1.069 |
| 0.051 | 0.061 | 296 | 0.677 |
| 0.061 | 0.070 | 169 | 0.387 |
| 0.070 | 0.079 | 74 | 0.169 |
| 0.079 | 0.089 | 7 | 0.016 |
| 0.089 | 0.098 | 0 | 0.000 |
| 0.098 | 0.107 | 0 | 0.000 |
| 0.107 | 0.116 | 0 | 0.000 |
| 0.116 | 0.126 | 0 | 0.000 |
| 0.126 | 0.135 | 0 | 0.000 |
| 0.135 | 0.144 | 0 | 0.000 |
| 0.144 | 0.154 | 0 | 0.000 |
| 0.154 | 0.163 | 0 | 0.000 |

510 brackets rows from -0.042 through 0.042.

*FIG. 5B*

| >=Min | <Max | # Points | % |
|---|---|---|---|
| -0.400 | -0.381 | 0 | 0.000 |
| -0.381 | -0.363 | 22 | 0.025 |
| -0.363 | -0.344 | 905 | 1.029 |
| -0.344 | -0.326 | 1132 | 1.287 |
| -0.326 | -0.307 | 689 | 0.783 |
| -0.307 | -0.289 | 472 | 0.536 |
| -0.289 | -0.270 | 463 | 0.526 |
| -0.270 | -0.251 | 408 | 0.464 |
| -0.251 | -0.233 | 366 | 0.416 |
| -0.233 | -0.214 | 303 | 0.344 |
| -0.214 | -0.196 | 329 | 0.374 |
| -0.196 | -0.177 | 309 | 0.351 |
| -0.177 | -0.159 | 352 | 0.400 |
| -0.159 | -0.140 | 413 | 0.469 |
| -0.140 | -0.121 | 521 | 0.592 |
| -0.121 | -0.103 | 527 | 0.599 |
| -0.103 | -0.084 | 710 | 0.807 |
| -0.084 | -0.066 | 805 | 0.915 |
| -0.066 | -0.047 | 1467 | 1.667 |
| -0.047 | -0.029 | 4560 | 5.182 |
| -0.029 | -0.010 | 16750 | 19.036 |
| -0.010 | 0.010 | 31466 | 35.761 |
| 0.010 | 0.029 | 11492 | 13.061 |
| 0.029 | 0.047 | 4156 | 4.723 |
| 0.047 | 0.066 | 2130 | 2.421 |
| 0.066 | 0.084 | 1093 | 1.242 |
| 0.084 | 0.103 | 659 | 0.749 |
| 0.103 | 0.121 | 349 | 0.397 |
| 0.121 | 0.140 | 249 | 0.283 |
| 0.140 | 0.159 | 233 | 0.265 |
| 0.159 | 0.177 | 264 | 0.299 |
| 0.177 | 0.196 | 256 | 0.291 |
| 0.196 | 0.214 | 437 | 0.497 |
| 0.214 | 0.233 | 393 | 0.447 |
| 0.233 | 0.251 | 507 | 0.576 |
| 0.251 | 0.270 | 610 | 0.693 |
| 0.270 | 0.289 | 1042 | 1.184 |
| 0.289 | 0.307 | 741 | 0.842 |
| 0.307 | 0.326 | 354 | 0.402 |

*FIG. 6B*

SYSTEM AND METHOD FOR PERFORMING QUALITY CONTROL

CROSS-REFERENCE TO RELATED APPLICATIONS

This present application is a continuation of U.S. patent application Ser. No. 16/457,199, filed Jun. 28, 2019, now U.S. Pat. No. 11,210,788, which is a continuation-in-part of U.S. patent application Ser. No. 15/928,484, filed Mar. 22, 2018, now U.S. Pat. No. 11,120,179, the disclosures of each of which applications is incorporated herein by reference in its entirety for all purposes.

TECHNICAL FIELD

The disclosure relates generally to the field of quality control, specifically and not by way of limitation, some embodiments are related to automatically performing quality control on manufactured dental prostheses.

BACKGROUND

Recently, CAD/CAM dentistry (Computer-Aided Design and Computer-Aided Manufacturing in dentistry) has provided a broad range of dental restorations, including crowns, veneers, inlays and onlays, fixed bridges, dental implant restorations, and orthodontic appliances. In a typical CAD/CAM based dental procedure, a treating dentist can prepare the tooth being restored either as a crown, inlay, onlay, or veneer. The prepared tooth and its surroundings are then scanned by a three-dimensional (3D) imaging camera and uploaded to a computer for design. Alternatively, a dentist can obtain an impression of the tooth to be restored and the impression may be scanned directly, or formed into a model to be scanned, and uploaded to a computer for design.

Dental prostheses are typically manufactured at specialized dental laboratories that employ computer-aided design (CAD) and computer-aided manufacturing (CAM) milling systems to produce dental prostheses according to patient-specific specifications provided by dentists. In a typical work flow, information about the oral situation of a patient is received from a dentist, and the dentist or dental laboratory designs the dental prosthesis. Where the prosthesis is milled from a block of material, a material block having a size, shape, color, and material-type properties suitable for creating the prosthesis is selected.

After the milling process, the milled material blocks are cleaned. Subsequent to the cleaning process, the milled material blocks are manually transferred, inspected, and logged from the milling and cleaning processes to a sintering tray in preparation for the glazing process. A final inspection process may be performed after the sintering process. Conventionally, the final inspection process is done manually. In other words, each manufactured dental prosthesis is visually inspected by a quality control (QC) personnel. However, certain defects such as improper size (i.e., too small or too large) and milling defects such as steps are very hard to visually detect. Even the most well-trained and seasoned QC personnel will have a hard time detecting these types of defects. Furthermore, in a situation in which a dental prosthesis is manufactured without a physical dental model, there may be no physical reference for fit testing. Even when there is a model available (e.g., a stone or resin model that is poured or additive manufactured), the model itself may also contain dimensional errors that are often larger than is typical in manufacturing the prosthesis. Additionally, even if the QC personnel can detect a step or a fitting issue, it is virtually impossible for the QC personnel to quantify the error. The failure to quantify the defects make it very difficult for QC engineers to take corrective actions. Accordingly, what is needed is a system and method for performing quality control by identifying and quantifying manufacturing defects of dental prostheses.

SUMMARY

Disclosed are example embodiments of methods and systems for identifying and quantifying manufacturing defects of a manufactured dental prosthesis. One of the methods for performing quality control on a manufactured dental prosthesis comprises: determining whether the manufactured dental prosthesis is a good or a defective product based at least on a differences model generated by comparing a design model and a scanned model of the manufactured dental prosthesis. The differences model can comprise of points with offset values determined by difference in distance between a point in the design model and the corresponding best-fitting point in the scanned model of the manufactured dental prosthesis. In a perfect match, the offset value is zero.

The manufactured dental prosthesis can be determined to be a good or defective product based at least on one or more statistical analysis of the differences model. The manufactured dental prosthesis can be also determined to be a good or defective product based at least on the standard deviation of offset values of the differences model. The manufactured dental prosthesis can be an anterior crown. The anterior crown can be determined to be a defective product if the standard deviation of the offset values of the differences model is above 20 microns.

The differences model can be generated by comparing the design model and the scanned model and then omitting from the differences model data points below a margin line of the differences model. The margin line can have a height ranging between 10-20% of the overall height of the manufactured dental prosthesis. The surface area below the margin line can be very difficult to scan accurately because of at least the presence of a sharp apex. Inaccurate scan data can lead to false positive detections of bad parts. For this reason, data points of the surface area below the margin line are omitted from statistical analysis (e.g., standard deviation calculation, distribution analysis).

The occlusal surface of the manufactured dental prosthesis can also be omitted from the differences model. Occlusal surfaces can have very high variations due to their complex geometry of grooves, ridges, cusps, and pits. For example, certain surface features have radii that are smaller than a minimum radius a milling machine can produce. These small differences because they are a concavity are not significant in the function of the manufactured prosthetic (e.g., a crown) but they would tend to skew the statistical results. As such, data points of the occlusal surface can be omitted from the data set used to perform statistical analysis as occlusal surface data would great skew the statistical results. When the manufactured dental prosthesis is a dental bridge, the occlusal surface of each tooth of the dental bridge can be omitted.

In a dental bridge, data points of surfaces between any two adjacent teeth of the bridge can be omitted. Similar to the occlusal surfaces discussed above, these interproximal surfaces typically have radii that are smaller than a minimum radius a milling machine can produce, and these small differences are not essential to the function and fit of the dental bridge. Accordingly, to achieve a more reliable quality control process, data points from interproximal surfaces of dental bridge manufactured prosthetics can be omitted from the differences model.

The surface areas of the differences model where sprues are located can also be omitted from the differences model. In other words, data points within the sprue areas can be omitted from the data set used to perform quality control analysis. If not omitted, data points within the sprue areas can cause large localized deviation and will skew the statistical results. A sprue location is where a sprue is placed during the milling process to secure the manufactured dental prosthesis within a milling block. By design, sprue locations are not placed in functional areas (e.g., contact regions) and/or close to the occlusal table.

Also disclosed is a system for performing quality control on a dental prosthesis, the system comprises a quality control module configured to determine whether the dental prosthesis is a good or a defective product based at least on a differences model.

The differences model can be generated by comparing a design model and a scanned model of the manufactured dental prosthesis. The quality control module can be configured to determine whether the dental prosthesis is a good or defective product by determining a standard deviation of a difference value of points in the differences model.

In some embodiments, the quality controller can determine that the manufactured dental prosthesis is either too small or large based on the distribution of differences. If the distribution is negatively biased, when compared to a normal distribution, the manufactured dental prosthesis can be deemed too small. If the distribution is positively biased, when compared to a normal distribution, the manufactured dental prosthesis can be deemed too large.

The quality controller can also determine that the manufactured dental prosthesis has a step when a distribution of differences includes peaks at a left and/or right side of a normal distribution curve. The system may further include a scanner for scanning the manufactured dental prosthesis and for generating the scanned 3D data model.

In yet another embodiment, a second method for performing quality control on a dental prosthesis is disclosed. The method includes: generating a design model of a dental prosthesis; manufacturing the dental prosthesis based on the generated design model; scanning the manufactured dental prosthesis to create a 3D scan model; generating a differences model by comparing the generated CAD with the 3D scan model; and determining whether the manufactured dental prosthesis is a good or a defective product based at least on a differences model.

In yet another embodiment, the systems and methods for performing quality control discussed herein are used as a feedback loop to detect machines, materials, operators, and other system and method components that may be performing in an unintended manner. The distribution of failures for all population effects are monitored and flagged with automated identification and shutdown of any machinery, operators, or systems that are determined to be performing below an intended level. In still further embodiments, the central tendency of each distribution of failures is monitored and used to adjust any appropriate nominal operating values for the affected machines, with an expected result of having fewer defects overall.

The features and advantages described in the specification are not all inclusive and, in particular, many additional features and advantages will be apparent to one of ordinary skill in the art in view of the drawings, specification, and claims.

Moreover, it should be noted that the language used in the specification has been principally selected for readability and instructional purposes and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 4A and 4B illustrate examples of differences models of two different dental prostheses in accordance with some embodiments of the present disclosure.

FIG. 5B is a spreadsheet listing the offsets distribution of the differences model of FIG. 5A.

FIG. 6B is a spreadsheet listing the offsets distribution of the differences model of FIG. 6A.

DETAILED DESCRIPTION

In the following description, for purposes of explanation, numerous specific details are set forth to provide a thorough understanding of the invention. However, it will be apparent to one skilled in the art that the invention can be practiced without these specific details. In other instances, structures and devices are shown in a block diagram form in order to avoid obscuring the invention.

Overview

Figure 1:
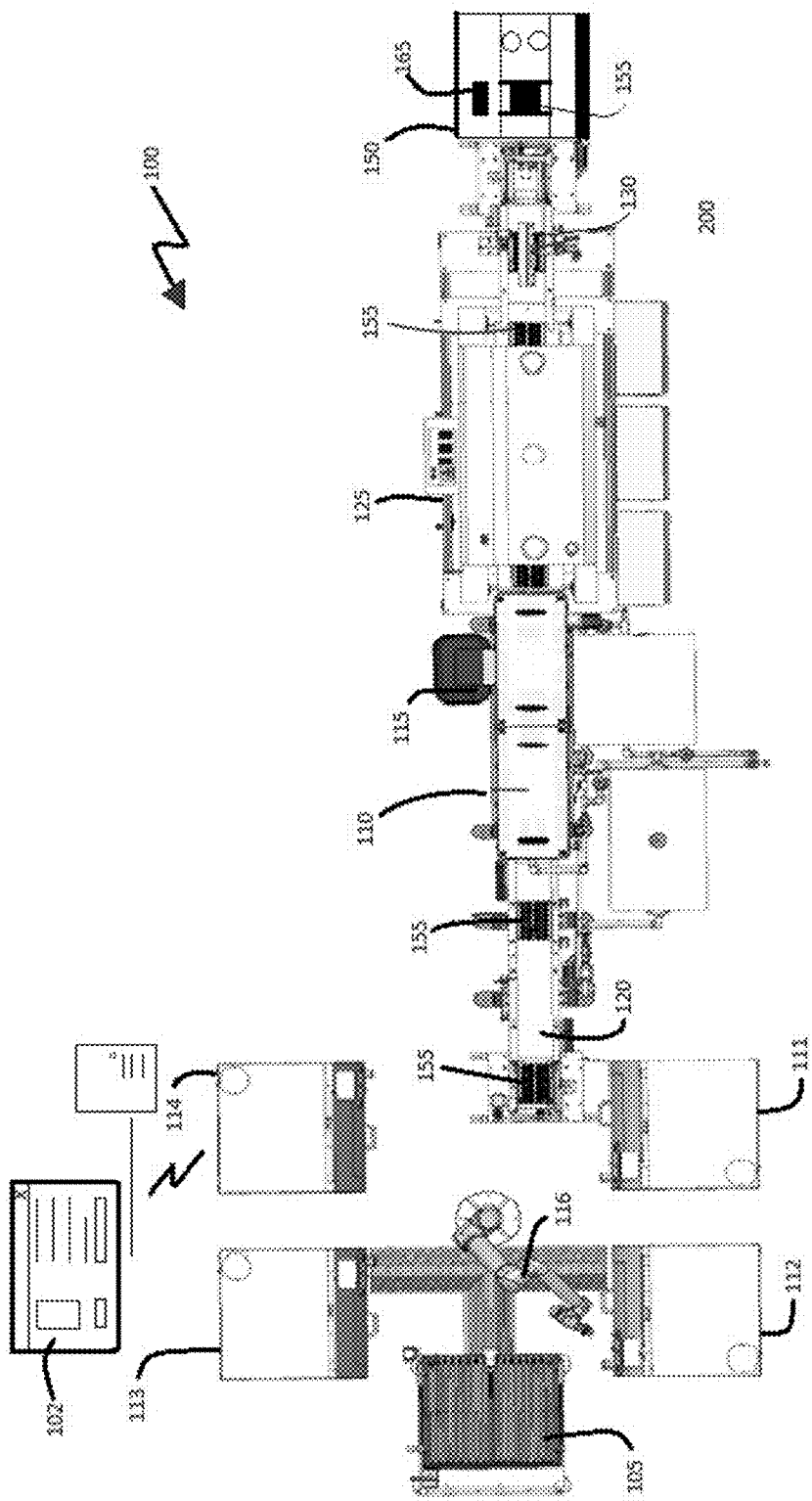
FIG. 1 is a high-level block diagram of a system for manufacturing dental prosthesis in accordance with some embodiments of the present disclosure.

To better understand the quality control process, an overview of an exemplary dental prosthesis manufacturing process is provided. FIG. 1 illustrates a system 100 for manufacturing custom designed dental prostheses in a continuous automated process in accordance with some embodiments of the disclosure. Information concerning custom dental prostheses can be received by a dental prosthesis management system 102 that is in communication with an automated manufacturing system 100. Dental prosthesis management system 102 can be locally or remotely located. Additionally, one or more functionalities (modules) of dental prosthesis management system 102 can reside locally or remotely. For example, a local tracking and inspection module can be part of dental prosthesis management system 102, and a plurality of dentition databases (not shown) can be located on the cloud.

System 100 includes a plurality of process stations such as a milling center 105, a separating station 110, a scrap disposal station 115, and a transfer and inspection/tracking station 150. Milling center 105 can mill material blocks and form custom dental prostheses according to design specifications, which can be obtained from dental prosthesis management system 102. Separating station 110 is provided for separating workpieces into milled custom dental prostheses and remnant material blocks. Scrap disposal station 115 can be provided to remove and eliminate remnant material blocks from further processing.

System 100 may include a transfer system, such as a conveyor system 120 that comprises one or more conveyor units, automatically and/or simultaneously transfers a plurality of custom dental prostheses between remaining, post-milling process stations. Each process station may comprise a different transfer unit, or a different conveyor suitable to the environmental conditions of the process. Optionally, additional process stations may be included in the automated system, including an oven 125 for thermal treatment, and a cooling unit 130.

A carrier or container 155 may be provided to move material blocks and dental restorations between processing units. In one embodiment, container 155 may have a structure that is configured to interface with each process station, including individual pockets or compartments to separate and track a plurality of custom milled workpieces for simultaneous processing into custom dental prostheses in a hands-free and automated process. Container 155 can include a plurality of pockets to hold a plurality of workpieces in a specified location and orientation for processing through the plurality of process stations. Each station, such as separating unit 110 and scrap disposal unit 115, may comprise devices having components in spaced arrangements that align with the tray pockets and with the orientation of workpieces held within the pockets. The assignment of an individual workpiece to a specific tray pocket isolates each workpiece and identifies the custom dental prostheses throughout the automated process until removal of the prostheses from the tray, for accurate association of each custom dental prosthesis with corresponding dental prosthesis information.

Dental prosthesis management system 102 may receive dental prosthesis information associated with a proposed custom dental prosthesis to be processed by milling center 105.

Dental prosthesis management system 102 may comprise a system capable of performing tasks related to the manufacture of dental prostheses, and can be implemented on a computer system, such as a server. Dental prosthesis management system 102 may include a module for selecting dental prostheses, a machining instructions tool, one or more cameras, one or more sensors, and a dental prosthesis database. The machining instructions tool, in turn, may include more than one database for storing information related to the modules or materials used within the system and information pertaining to the custom dental prosthesis, and machining instructions. Databases may be internal to dental prosthesis management system 102, located on an external device connected to dental prosthesis management system 102, or located remotely, such as in cloud-based storage.

Information used to design and/or manufacture a dental prosthesis for a patient may be received by dental prosthesis management system 102 from a dentist or dental office. In some representative examples, a dentist or dental office will provide information concerning the oral situation of a patient, such as a physical impression or an electronic file containing a digital scan of the patient's oral situation. Additionally, the dentist or dental office may also provide instructions for the material or materials to be used to manufacture the prosthesis, the type and construction of the prosthesis, the shade or other aesthetic features for the prosthesis, and the like. As used herein, the term "dental prosthesis" refers to any dental restorative including, without limitation, crowns, bridges, dentures, partial dentures, implants, onlays, inlays, or veneers.

In some embodiments, information regarding the selected material block is used for calculating machining instructions and is stored in a database of dental prosthesis management system 102. For example, material blocks that undergo dimensional reduction after milling and sintering are associated with material-specific information in order to accurately calculate machining instructions to derive the dimensions of an enlarged prosthesis milled from a pre-sintered block. The information regarding the material properties of the specific material that is used in the milling calculations may be associated with the material and stored in a database until the material block is selected and the information is retrieved.

After all machining steps are completed, the workpiece may be removed from the mill manually, or by a robotic handler 116. In one embodiment, robotic handler 116 loads a plurality of custom workpieces from a single mill or a plurality of mills (e.g., mills 112, 113, 114, and 115) onto container 155.

Quality Control

System 100 can include one or more quality control stations 200. For example, quality control station 200 can be placed immediately after the milling process to determine whether the milled dental prosthesis is of proper size (taken into account the enlargement factor of the milling block) or has milling defects such as steps. Quality control station 200 can also be placed after the sintering process, this allows quality control station 200 to check the final size (and other parameters) of the dental prosthesis after the sintering process. Alternatively, quality control station 200 can be placed both locations—after the milling and sintering processes.

Quality control station 200 can also be communicatively linked to dental prosthesis management system 102. This enables quality control station 200 to determine the enlargement factor (EF) of the milling block that will be used to form a dental prosthesis. Taking the EF factor into account, quality control station 200 can determined whether a milled dental prosthesis is of the proper size. For example, if quality control station 200 determines that the milled dental prosthesis has the same size (or smaller) as the design model (received from dental prosthesis management system 102) of the same dental prosthesis, then the part can be flagged for inspection and/or rejection. In this way, the defective-milled dental prosthesis does not have to go through the sintering process. A design model can be a computer-generated model (e.g., CAD model, 2D calibrated model) generated based on a patient's specific data (e.g., dentition, mold impression). The design model can also be a CNC (computer numerical control) simulated model or a 3D printing simulated model. The CNC simulated model can be a virtual model generated from a simulated CNC process. Similarly, the 3D printing simulated mode can be a virtual model generated from a simulated 3D printing process.

The sintering process starts at transfer-tracking station 150, where one or more milled dental prostheses are transferred to a sintering tray 165. As mentioned, quality control station 200 can also be placed after the sintering process in order to perform quality control on the sintered dental prosthesis. In this way, various defects such as improper size, cracks, chips, steps, etc., can be detected and quantified. In some embodiments, system 100 can have two quality control stations, one after the milling process and one after the sintering process.

Figure 2:
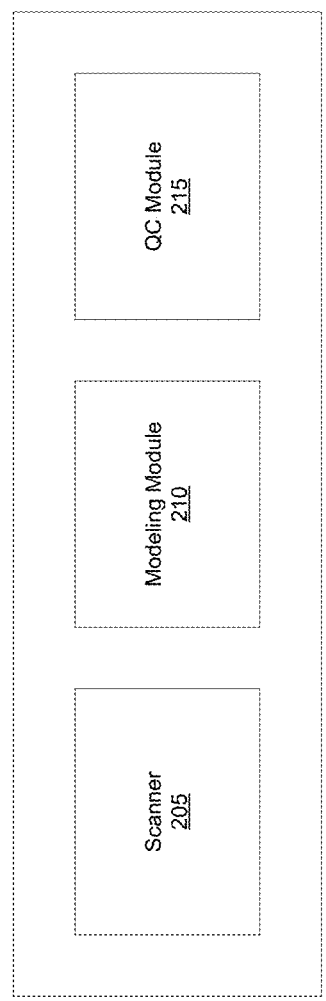
FIG. 2 is a block diagram of a quality control system in accordance with some embodiments of the present disclosure.

FIG. 2 illustrates the quality control station 200 in accordance with some embodiments of the present disclosure. Quality control station 200 includes a scanner 205, a modeling module 210, and a QC module 215. Scanner 205 can be a contact or non-contact inspection device that can generate a scanned data model of the scanned object. The scanned data model can be a 3D model or 2D calibrated model. Scanner 205 can use light or radio waves having wavelengths at any point or range in the electromagnetic spectrum suitable to scan a dental prosthesis. In some embodiments, the light used to scan the dental prosthesis can have a wavelength range between 400-500 nm. Because a finished dental prosthesis is glazed, it can be semi-translucent and thereby can affect the way light is reflected. To address this issue, in one embodiment, the dental prosthesis can be pre-heated so that it will emits radiation in the infrared (IR) region of the radio spectrum. In this embodiment, scanner 205 can use light with wavelength in the IR region to scan the pre-heated dental prosthesis.

Scanner 205 can generate a 3D data set of the scanned dental prosthesis in a stereolithography CAD format known as STL. Scanner 205 can also generate other types of 3D data set format such as 3DS, BLEN, SCL, SKP, raw point output, or any other type of format as required by modeling module 210. In some embodiments, scanner 205 can scan a dental prosthesis and generate a 2D calibrated image. To generate the 3D data set, scanner 205 can use 3D scanning technology such as, but not limited to, laser triangulation, structured light, laser profilometry, focus variation, optical coherence tomography (OCT), conoscopic holography, confocal microscopy, computed tomography (CT), contact measurement, and photogrammetry.

Modeling module 210 can include 2D/3D best-fitting algorithms to best-fit spatial points of a design data set (e.g., CAD data set, calibrated 2D data set, CNC simulated data set, 3D printing simulated data set) of a dental prosthesis to the corresponding best-fitting spatial points of the scanned 3D data set of the same dental prosthesis. Modeling module 210 can also generate a differences model based on the best-fitting results. A differences model can have the same number of spatial data points as the design data set and/or scanned 3D data set. In the differences model, each data point can be an offset between the design data set and the scanned 3D data set. In an example of a CAD data set, a zero offset means that the point in the scanned 3D data set is in the exact location as the corresponding best-fitting point in the CAD data set. In other words, if the differences model comprises of all zero offset points, then the scanned 3D data set is exactly the same as the CAD data set.

A differences model can also be generated by comparing data points of other type of design data set such as CNC or 3D printing simulated model with data points of the scanned 3D data set.

QC module 215 can include a data preprocessing module (not shown) configured to preprocess the data set of the differences model before statistical analysis can be performed to determine whether the prosthesis is a defective or a good product. The data preprocessing module can be an integrated component of QC module 215 or can be an independent module that can be called (via an application programming interface) to preprocess the differences model. The data preprocessing module can include dentition modeling software and graphical user interfaces (GUI) that enable a user to select various locations on the differences model and their corresponding data for omission to generate a reliable band of data on which statistical analysis can be performed at a later stage. For example, using the GUI of the data preprocessing module, the user can adjust a computer-generated boundary of the margin line by moving one or more points of the margin line. In this way, the user can define the margin surface as desired. In another example, the data preprocessing module can propose the occlusal surface to be omitted from the differences model. Using the GUI, the user can reject, accept, or modify the proposed occlusal surface.

The data preprocessing module can modify the differences model to generate a modified differences model based on the type of prosthesis (e.g., posterior crown, anterior crown, bridge) being analyzed. For example, the preprocessing module can generate a modified differences model for a posterior crown by using a set of rules that is different from a set of rules used to generate a modified differences model for an anterior crown. The preprocessing module can also use yet another different set of rules to generate a modified differences model for a bridge. The preprocessing module can use different set of rules to generate differences models for anterior and posterior bridges. In some embodiments, the preprocessing module can use the same set of rules to generate differences models for anterior and posterior bridges.

A modified differences model is a 3D differences model with its data set being truncated or deleted at various portions that correspond to certain locations of the unmodified 3D differences model. In other words (from a 3D perspective), a modified differences model is 3D differences model that is trimmed at various locations of the 3D differences model. For example, the original (e.g., unmodified) differences model can include data of the occlusal surface and/or the margin area of a crown. In a modified differences model, the data of the occlusal surface and/or the margin area can be deleted and therefore are not included in the statistical analysis. The omission of the occlusal surface and/or the margin area creates a band of data representing the modified differences model that can be reliably used to perform statistical analysis. A margin area is an area of a tooth near or adjacent to the gingival margin.

When performing quality control on anterior crowns, QC module 215 can use a specific set of rules for anterior crowns to generate the modified differences model (e.g., a model with a band of good data). In some embodiments, QC module 215 can omit data points located on the lingual and buccal surfaces of the differences model of the anterior crowns. Data points within the boundary regions between the lingual and mesial, mesial and buccal, buccal and distal, and lingual and distal can either be omitted or included in the modified differences model. In some embodiments, the boundary regions can be included in the modified differences model of an anterior crown. This process can generate a band of data covering the distal and mesial surfaces of the differences model for anterior crown. In an anterior crown, the manufacturing tolerances of the distal and mesial surfaces are tightly controlled because they are adjacent surfaces to neighboring teeth. If the tolerances in these areas are not met, the crown may not fit because it can be too large or too small.

For posterior crowns, QC module 215 can omit data points located on the occlusal surface and/or the margin surface of the differences model. This generates a reliable band of data for statistical analysis by eliminating potentially high variability surfaces.

For posterior bridges, QC module 215 can omit data points located on the occlusal, margin, and sprue areas of each crown of the bridge. Data points of the intersection areas of the bridge can also be omitted. An intersection area is an area between the two crowns of a bridge. Tolerances in the intersection areas are not important and can be omitted from the differences model. A sprue area is an area on a crown where a sprue is located to secure the bridge within the milling mold. A bridge can have two or more sprues, typically three sprues are used to secure the bridge within the milling mold. Once the milling process of a bridge is completed, the sprues are broken off and the sprue areas on the bridge are manually sanded and smoothened. Because of the manual sanding and smoothening process, which can be highly variable, the sprue areas can be omitted from the differences model to generate a modified differences model.

In some embodiments, a posterior crown, anterior crown, or bridge is manufactured using wax or other removable support material such that a sprue is not needed or formed during the machining process. See, e.g., the manufacturing methods described in United States Patent Application Publication No. 2017/0156828, which is incorporated by reference herein. When a sprue is not formed on the body of the manufactured prosthesis, there is no need to omit data points associated with the sprue area, and more of the surface area of the manufactured prosthetic can be incorporated into the differences model.

QC module 215 can analyze the differences model and/or the modified differences model to determine the types of defects present in the manufactured dental prosthesis. In some embodiments, QC module 215 is configured to analyze the modified differences model to perform quality control. QC module 215 can quantify the defects by quantifying the level or severity of the defects. Exemplary types of defects include improper size (e.g., enlargement factor (EF)), chips, cracks, steps, indentations (e.g., CAM error), etc. Some defects such as cracks and chips can be visible to the human eye. However, defects such as improper size, small indentations, and steps can be very difficult (if not impossible) to visually detect with the human eye. For example, a crown can be too small just by 50 microns under the tolerance. This type defect would be almost impossible to perceive by a human inspector. An alternative manual inspection method is to use a Vernier caliper to check the size of the crown at various locations. However, this would be very inefficient and costly in term of the human hours required. In another example, a dental prosthesis can have a step having a height of 50 microns. Even though the resolution of the human eye is higher than 50 microns, a step of this size is extremely hard to spot because it can blend in with the surrounding surfaces of the dental prosthesis. In some embodiments, a step of 30 microns is acceptable.

QC module 215 can also compare a CNC or 3D simulated model to a CAD design model of a dental prosthesis to generate a differences model. In this way, any kinematic and/or machine milling constraints can be identified by the differences model. The identified constraints can then be used to modify the CAD design model to improve the design of the dental prosthesis. By using simulated models (e.g., CNC simulated, 3D simulated) the need to make the physical model and scanning the physical model to generate a 3D scanned data set can be optionally bypassed. Alternatively, comparing simulated models with design models can be used as an additional QA step.

In some embodiments, QC module 215 can determine whether the scanned dental prosthesis is a good or defective part based on the distribution of offsets of the modified differences model (e.g., band of data). For example, in a good part, all of the offsets have a distribution that is similar to a normal distribution. In a defective part, the distribution of the offsets is biased in the negative or positive direction. A negative direction is toward the negative side from the center of the normal distribution. Alternatively, a defective part can have a distribution with one or more peaks in the negative or positive direction. In this way, QC module 215 can determine whether a part is too small or large or whether it has steps. A more detailed discussion on statistical analysis is provided below.

It should be noted that one or more functions and/or features of modeling module 210 and QC module 215 can be integrated into scanner 205. Similarly, one or more functions of QC module 215 can be integrated into modeling module 210 or vice versa. For example, if all functions and/or features of modeling module 210 and QC module 215 are integrated into scanner 205, then scanner 205 can also generate the differences model and perform statistical analysis on the differences model to determine whether a manufactured dental prosthesis is a good or defective part.

QC module 215 can also provide a feedback loop to detect machines, materials, and operators that may be performing at an unexpected or unintended performance level, and then initiate corrective actions. For example, in some embodiments, the QC module 215 will initiate shutdown of one or more manufacturing machineries based at least on one or more results of one or more statistical analysis. For example, if QC module 215 detects that the distribution of differences has more two or more peaks—which is an indicator of a step—QC module 215 can initiate shutdown of one or more machineries in the milling process. In another example, if QC module 215 detects that the distribution of differences is positively biased—which is an indicator that the crown is too big and could be related to the crown's EF—QC module 215 can initiate shutdown of one or more machineries that are responsible for generating the milling block. QC module 215 can also send data relating to the defective part back to dental prosthesis management system 102 for tracking. For example, QC module 215 can collect data relating to the defective crown such as, but not limited to, the crown ID, milling block ID, milling machine ID, sintering profile ID, and send them back to dental prosthesis management system 102. In still further embodiments, the QC module 215 monitors the central tendency of each distribution of failures and uses the monitored values to adjust any appropriate nominal operating values for the affected machines, with an expected result of having fewer defects overall.

Figure 3:
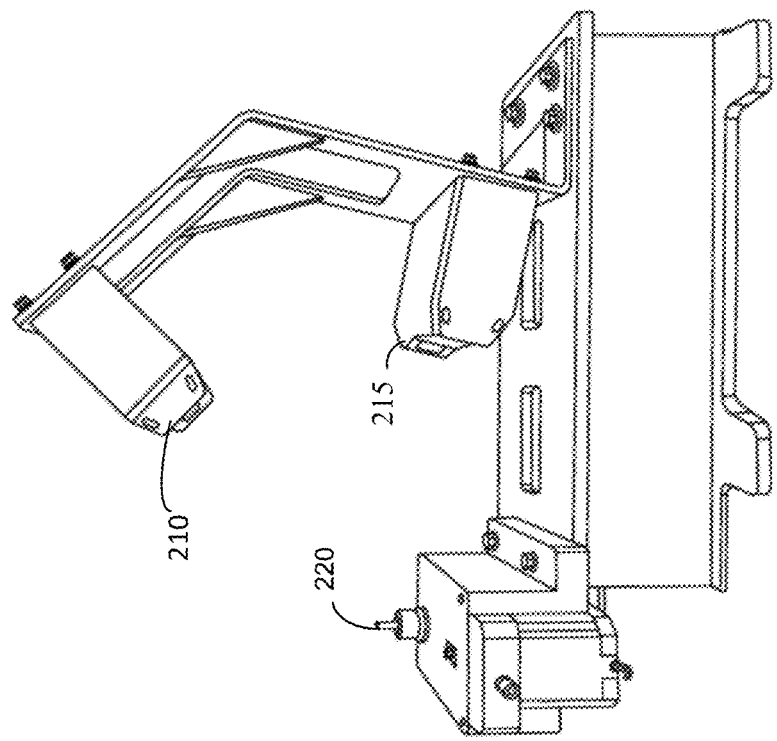
FIG. 3 illustrates a scanner in accordance with some embodiments of the present disclosure.

FIG. 3 illustrates scanner 205 in accordance with some embodiments of the present disclosure. Scanner 205 includes one or more sensors 210 and 215 and a rotatable holder 220. Each of the sensors can use blue light, which can have a wavelength between 450-495 nm. It should be noted that other wavelengths can also be used by scanner 205. In some embodiments, scanner 205 can have two sensors. The first sensor 210 can scan the dental prosthesis from the top at approximately 45 degrees angle. The second sensor 215 can scan the dental prosthesis from a negative angle with respect to the main horizontal surface of scanner 205. The negative scanning angle can range between 15-30 degrees. By having sensors 210 and 215 positioned at a positive angle and a negative angle, respectively, an accurate scan can be achieved.

Rotatable holder 220 can be air actuated to open up its fingers to hold the inside of a dental prosthesis. For example, a dental crown prosthesis typically has a void in the center. The void is where the dental crown will be installed to a prepared site having a corresponding tooth structure to mate with the void. The dental crown can be secured to the rotatable holder by having the fingers of the rotatable holder open outward and pressing against the inside wall of the void. Alternatively, the dental crown can be held in place using putty and/or adhesive.

Rotatable holder 220 can rotate 30 degrees or more for each scanning cycle. For example, rotatable holder 220 can rotate by 30 degrees 12 times in order to achieve a full rotation. After each rotation, rotatable holder 220 can pause for several seconds to allow sensors 210 and 215 to fully scan the section facing the sensors. In another example, rotatable holder 220 can rotate by 60 degrees 6 times or by 90 degrees 4 times, etc.

FIGS. 4A and 4B are examples differences model of a posterior crown generated by modeling module 210 in accordance with some embodiments of the present disclosure. FIG. 4A illustrates a differences model of a posterior crown 400 that passed the QC inspection process. As shown, posterior crown 400, which is indicated by the color green. Points within the green region (e.g., band of data) have a small offset that is within a predetermined tolerance (e.g., ±50 microns). In other words, the offsets between points in the CAD data set and the corresponding best-fitting points on the scanned 3D data set are below a given tolerance threshold in the green region. The tolerance threshold can range between 30 to 70 microns, depending upon the dental prosthesis being manufactured and patient's specification. In FIG. 4A, manufactured dental prosthesis 400 can be considered to be a good part when 70-90% (e.g., 75%, or 80%, or 85%) of the offsets (including zero offset) are within the tolerance threshold of ±50 microns. In some embodiments, QC module 215 can identify a manufactured dental prosthesis to be a good part when 85% or more of the offsets are within the tolerance threshold. Additionally, QC module 215 can require that all offsets greater than ±80-95 microns must account for less than a threshold percentage (e.g., 5%, or 3%, or 1%) of the differences distribution. In other words, as an example using a 1% threshold, out of 50,000 data points (offsets) in the differences model, there can be no more than 500 offsets greater than 80-95 microns. In some embodiments, all offsets greater than ±88 microns must account for less than 1% of the differences distribution in order for the manufactured dental prosthesis to be considered a good part.

The ±50 microns tolerance threshold and the 85% percentage threshold are determined based on empirical statistical studies to provide a balance of high quality and high yield rate. As noted, both the tolerance and percentage thresholds can be adjusted to meet 3-sigma engineering tolerances as required. For example, the percentage threshold can be adjusted to 95.45% to meet 3-sigma quality requirements. Additionally, the second tolerance threshold of ±88 microns is also selected based on empirical statistical studies to achieve high quality and high yield rate. Per 3-sigma requirements, in some embodiments, the second tolerance threshold can be adjusted to ±75 microns.

FIG. 4B illustrates an exemplary differences model of a manufactured dental prosthesis 450 that fails quality control. As indicated by the color legend, a substantial number of points on dental prosthesis 450 are outside of the tolerance threshold of ±50 microns. Specifically, dental prosthesis has a substantially number of points above +88 microns. This indicates that dental prosthesis 450 is too large. This could mean there is an error in the milling process, the sintering process, the EF calculation process, or a combination thereof. In some embodiments, an EF variation of ±30 microns is acceptable.

Figure 5A:
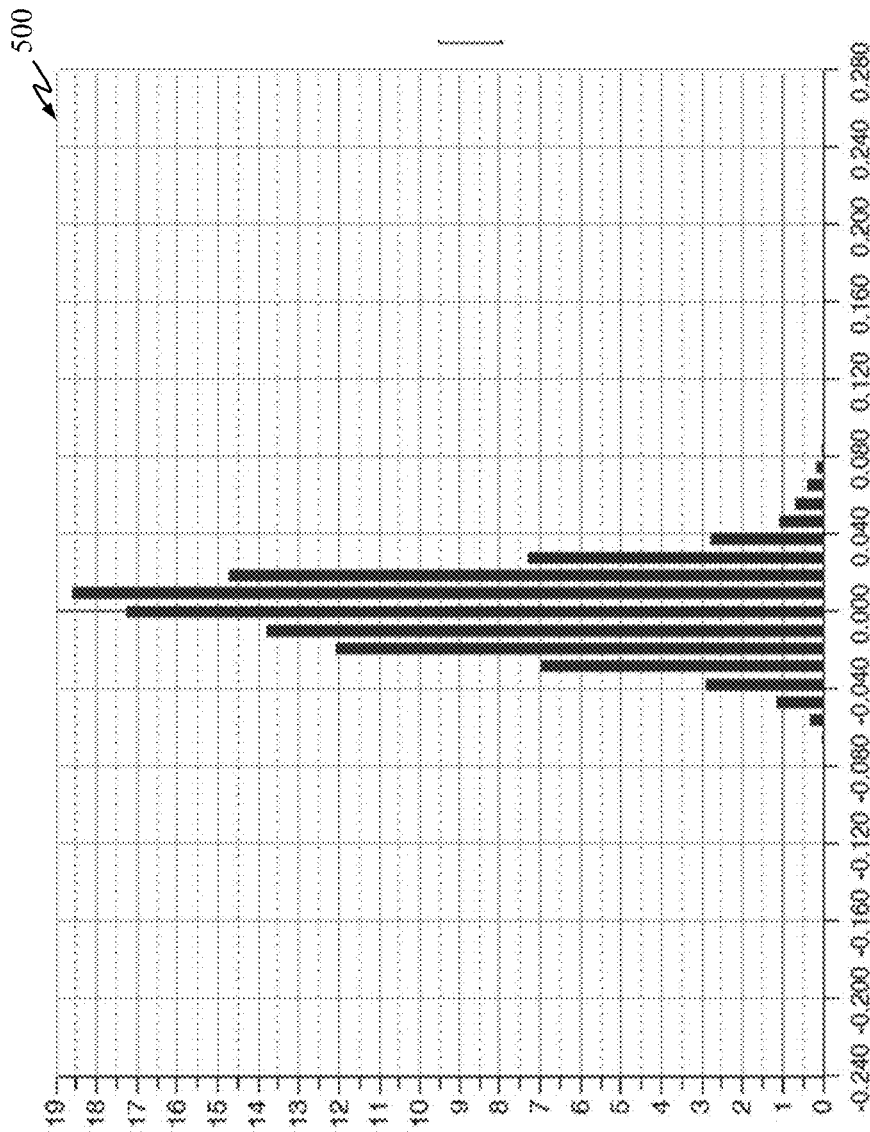
FIG. 5A is a graph illustrating the offsets distribution of a differences model in accordance with some embodiments of the present disclosure.

FIG. 5A illustrates an example distribution 500 of differences or offsets of dental prosthesis 400 that passes quality control. As illustrated, distribution 500 has a normal distribution where substantially all of the differences are within ±40 microns. This is well within the tolerance threshold of ±50 microns. Additionally, distribution 500 has a normal bell curve shape without any peaks at the outer edges (i.e., left and right sides of the bell curve). FIG. 5B is a spreadsheet listing the difference values of all sampling points in distribution 500. In FIG. 5B, the ±50 microns range is indicated by bracket 510. The total number of points within ±50 microns is over 94% of the total number of points. Each point is a difference (or offset) between a point in the CAD data set and the corresponding best-fitting point in the scanned 3D data set.

QC module 215 can analyze the distribution of differences to determine whether a part is good or defective. Prior to analyzing the distribution of offsets of the differences models, QC module 215 can eliminate a certain portion of the differences model from analysis. For example, QC module 215 can eliminate the top portion of a dental prosthesis. In a crown, the top portion is near the occlusal surface of the crown. QC module 215 can also eliminate a bottom portion of the crown proximal to the margin line (the bottom portion of the crown near the gum line of the patient once the crown is mounted). By eliminating the top and bottom portions from analysis, a reliable band of data (in the middle of the crown) can be generated. In this way, a more accurate statistical analysis can be performed. See FIGS. 9 and 10 for more discussion on the elimination of the top and bottom portions to create a reliable band of data.

In some embodiments, the percentage threshold is 85% and the tolerance threshold is ±50 microns. In other words, if 85% of all points are within ±50 microns, then the part can be considered to be a good part. The percentage threshold can range between 75% to 96%, depending upon the type of dental prosthesis to be manufactured, the milling block material, patient's specifications, etc. The tolerance threshold can have a range between 30 to 70±microns.

In some embodiments, QC module 215 can require a dental prosthesis to pass two sets of percentage and tolerance thresholds. The first set of percentage-tolerance thresholds can require all points within ±50 microns must account for greater than 85% of the total number of points. The second set of percentage-tolerance thresholds can require all points greater than ±88 microns must account for less than 1% of the total number of points. Thus, in order to pass quality control, a manufactured dental prosthesis must meet both sets of percentage-tolerance thresholds. For example, if a dental prosthesis meets the first set of percentage-tolerance threshold but fails the second set, then it can be classified as a defective part. It should be noted that a distribution of a differences model such as distribution 500 can be generated by modeling module 210 and/or QC module 215.

Figure 6A:
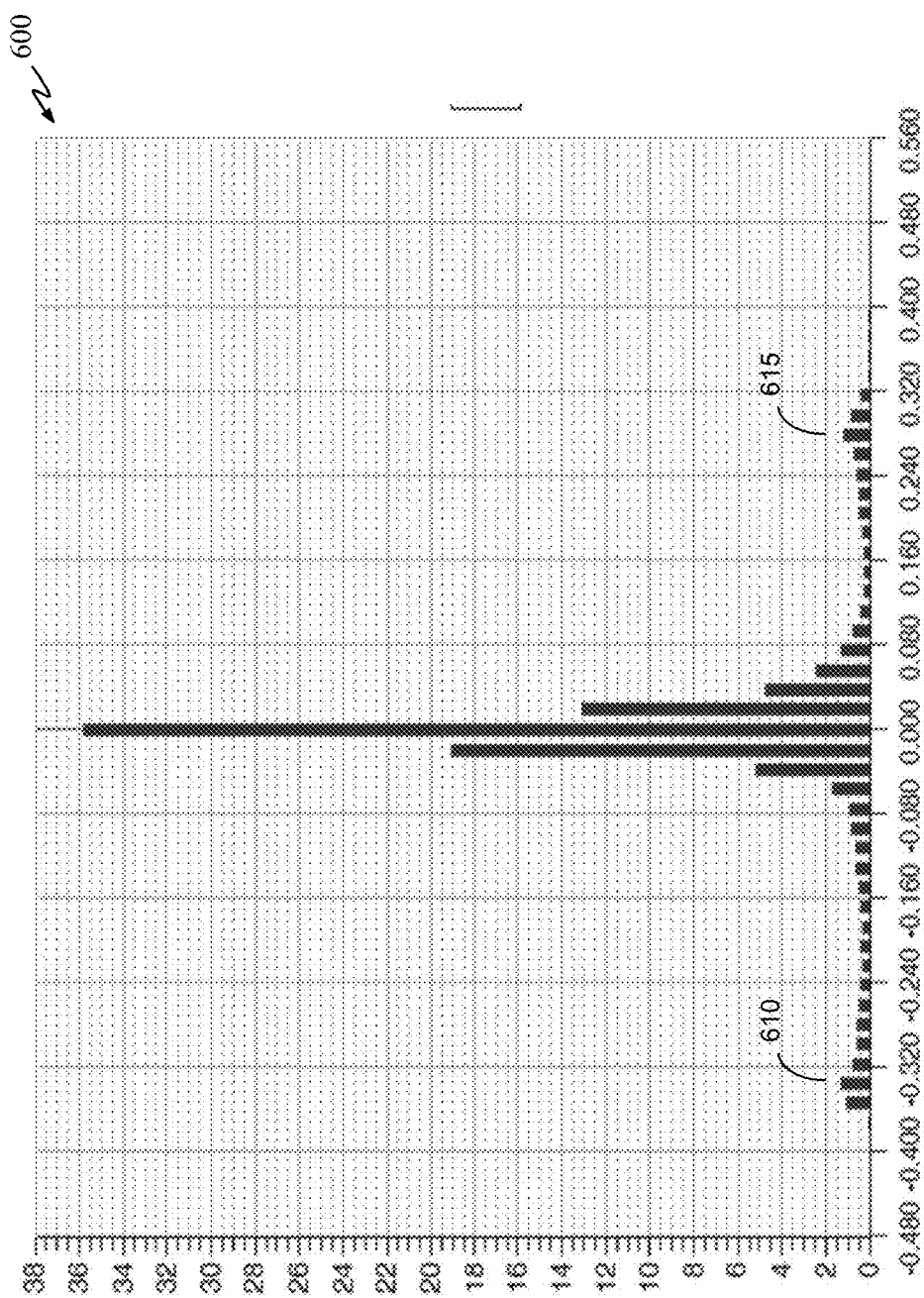
FIG. 6A is a graph illustrating the offsets distribution of a differences model in accordance with some embodiments of the present disclosure.

FIG. 6A illustrates an example distribution 600 of a differences model of dental prosthesis 450 that fails quality control. In distribution 600, the majority of the offsets fall between ±80 microns. Referring to FIG. 6B, which is a spreadsheet listing all offsets in distribution 600, approximately 79% of all points fall within the tolerance threshold of ±50 microns as indicated by bracket 620. This alone can result in the dental prosthesis being classified as a defective part. Additionally, distribution 600 includes two outer peaks 610 and 615 in FIG. 6A. This can indicate a step on the surface of dental prosthesis 450.

Referring again to FIG. 6B, distribution 600 does not meet the second percentage-tolerance thresholds requirement, which is less than 1% of points are larger than ±88 microns. Brackets 625 and 630 indicate a substantial number of points (much larger than 1% of the total number of points) are larger than ±88 microns. Accordingly, based on this distribution of differences, QC module 215 can classify this part as a defective part.

QC module 215 can also quantify the defect by determining whether a distribution has more than one peaks. In distribution 600, there are two peaks, one on each side of the normal distribution. As mentioned, these peaks indicate the present of a step on the surface of dental prosthesis 450. To quantify the steps, QC module 215 determines the point in the distribution where the percent of points starts to increase again, starting from the middle (zero deviation). In distribution 600, the location where percent of points starts to increase again is at 635 and 640. For example, at 635, the percent of points went from 0.351% to 0.374%. This increase reverses the decreasing trend. For example, starting in the middle at negative 10 microns, the percent of points within negative microns is 19.036%. From there moving up the spreadsheet (in the negative direction), the percent of points decreases as we move up the spreadsheet. At 635, the percent of points started to increase again. In some embodiments, QC module 215 can classify the step based on where the percent increase occurs in the distribution. At 635, the offset value is 196 microns. Similarly, at 640, where the percent of points increases from 0.291% to 0.497%, the offset value is also 196 microns.

Figure 7:
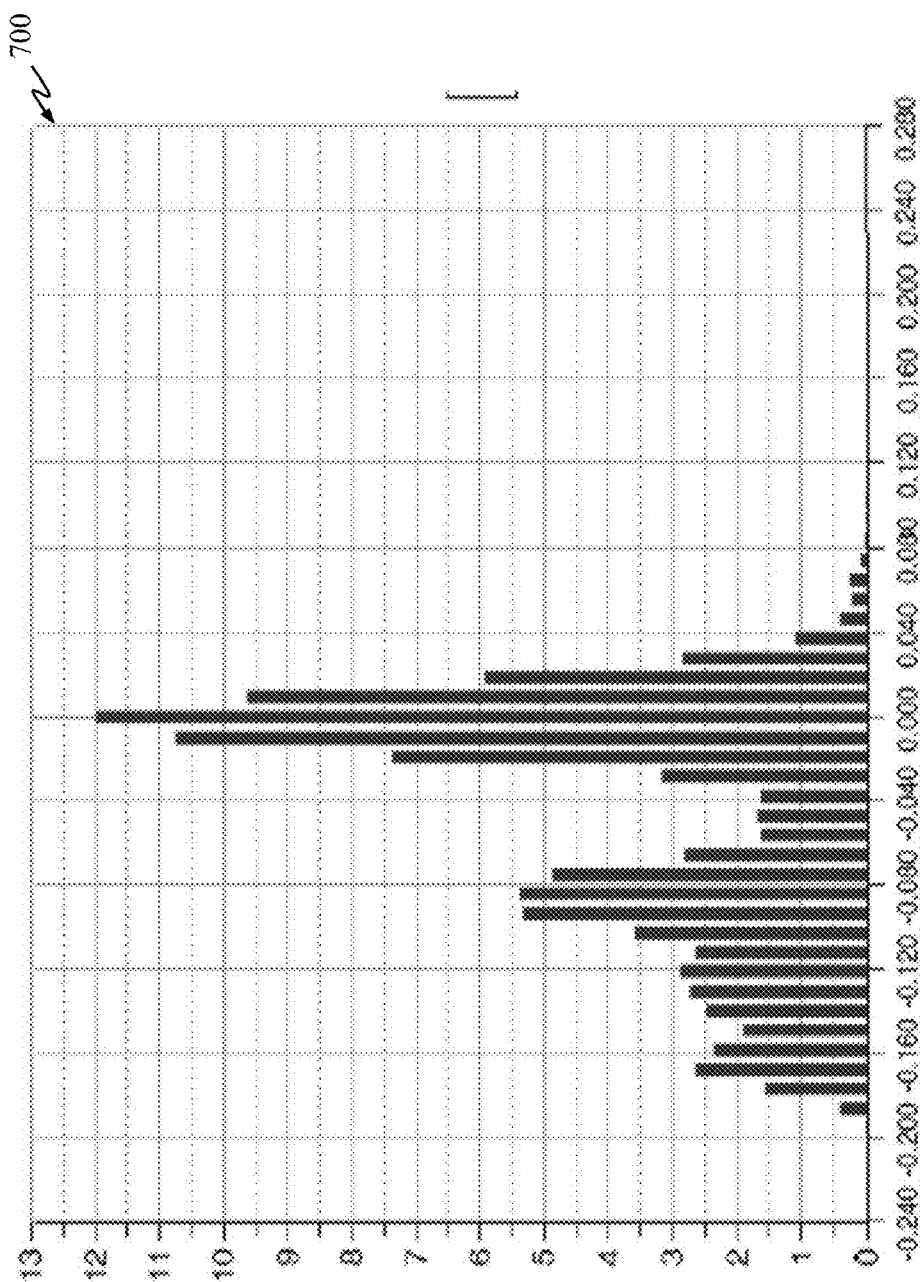
FIGS. 7 and 8 are example graphs illustrating the offsets distribution of differences models in accordance with some embodiments of the present disclosure.

FIG. 7 illustrates a distribution 700 of a differences model of a dental prosthesis that can be classified as being too small by QC module 215. To determine whether a manufactured dental prosthesis is too small or large, QC module 215 can analyze a distribution to determine whether the distribution is heavily biased toward the negative or positive side of the distribution curve. In FIG. 7, distribution 700 is heavily biased toward the negative side. In some embodiments, QC module 215 can classify a part to be a defective part if it is biased toward the negative or positive side of the curve. Additionally, QC module 215 can classify the dental prosthesis having distribution 700 to be a defective part because it appears that greater than 1% of the total points are outside of the ±88 microns.

Figure 8:
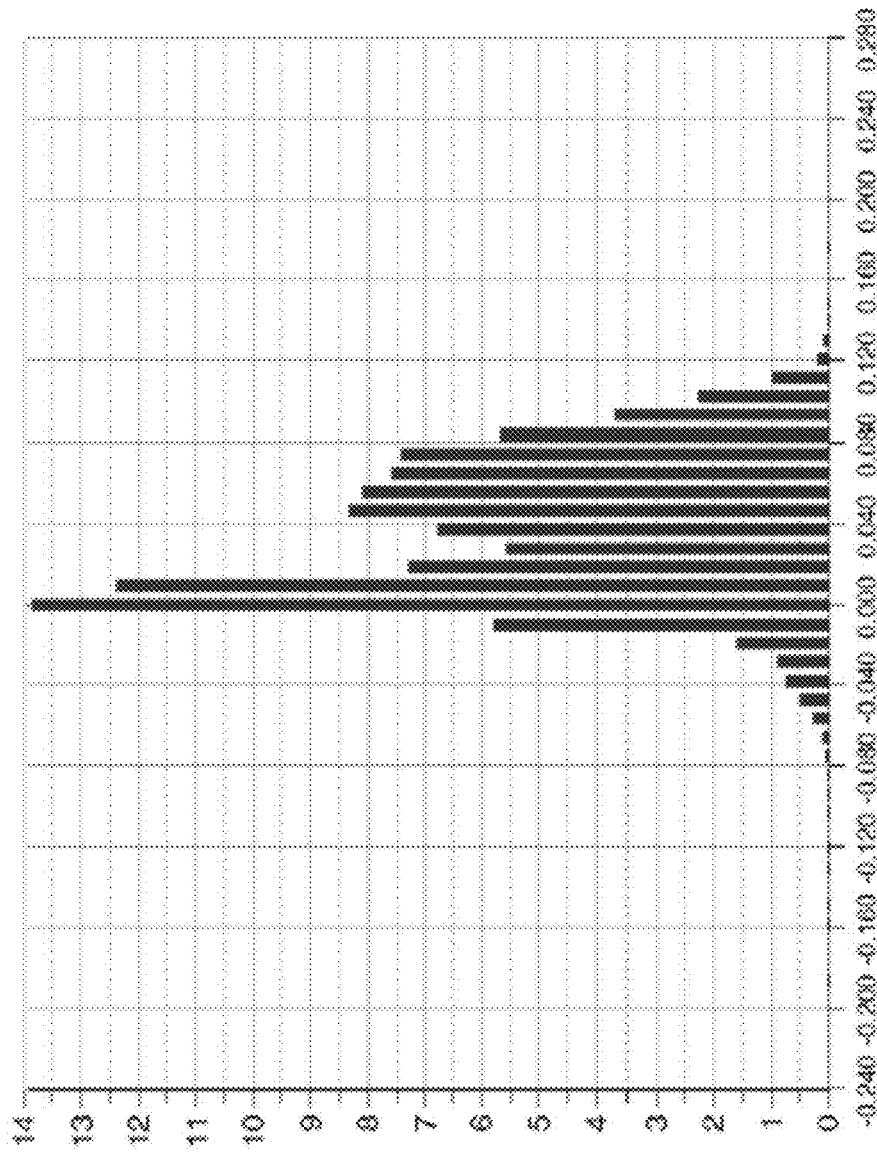

FIG. 8 illustrates a distribution 800 of a differences model of a manufactured dental prosthesis that can be classified as being too large by QC module 215. In distribution 800, a substantial number of points are located on the positive side of the distribution curve. This means that the dental prosthesis is likely too large. If the manufactured dental prosthesis (e.g., a crown) is too large, it would not fit properly into the prepared area inside the patient's mouth, e.g., the crown would not fit between the adjacent teeth or would have high occlusion. QC module 215 can also quantify the magnitude of size defect (too small or too large) by determining the percent of points in the biased portion of the curve. The average, mean, or median value of those points can be determined to quantify the size of the defect.

Figure 9:
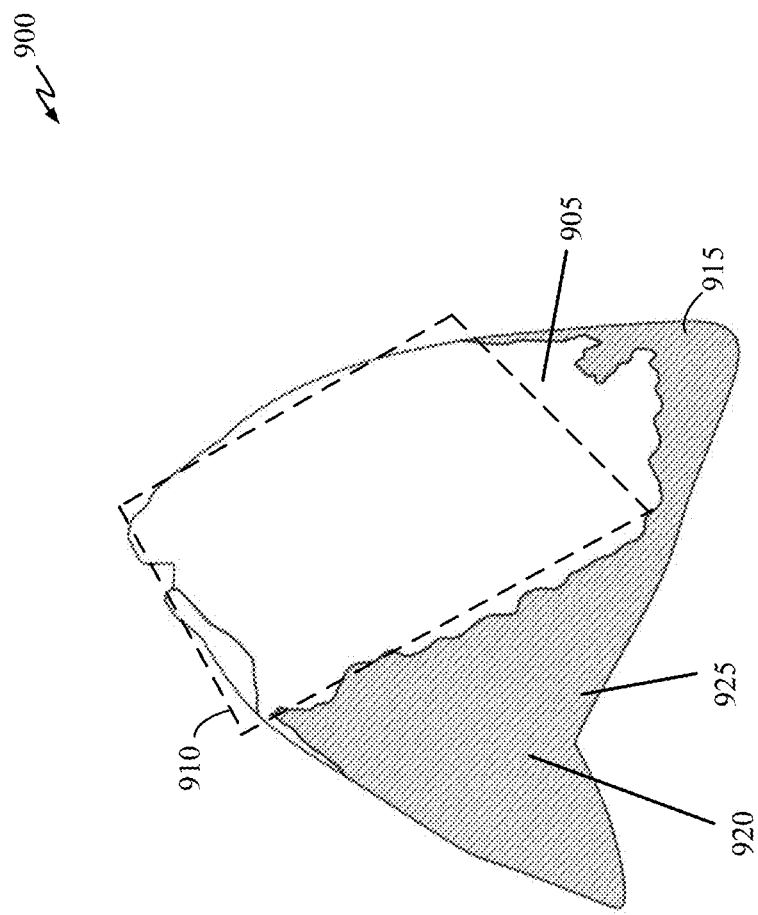
FIGS. 9-11 illustrate differences models of anterior crowns generated in accordance with some embodiments of the present disclosure.

FIG. 9 illustrates a differences model of anterior crown 900, which can be generated using QC module 215 by comparing the distance of each point of the CAD model of the anterior crown and the 3D scanned model of the manufactured anterior crown, which was produced based on the CAD model. As shown, the differences model of crown 900 can include data points from buccal region 905. In some embodiments, data points from upper buccal region 910 and/or upper lingual region (opposite side of buccal region) can be omitted from the differences model to generate a modified differences model (e.g., a reliable data set on which statistical analysis can be performed). Typically, the upper lingual and buccal regions of an anterior crown are not crucial surfaces for crown fitting. Accordingly, tight tolerances in these regions are not required. For example, ff statistical analysis is performed on the entire differences model, a good crown may be needlessly rejected because a slight defect in the upper lingual surface is present. The same crown can otherwise be an almost perfect part in other regions of the crown.

In some embodiments, the lower portion of buccal region 905 can be included in the modified differences model. As previously mentioned, a modified differences model is a differences model with a portion of the data set being trimmed. Alternatively, lower portion of buccal region 905 can be omitted from the differences model. In this sample, the differences model of crown 900 has high standard of deviations in both lower buccal region 915 and mesial region 920 of crown 900. The standard deviation of data points (offset values of points of the differences model) in the highlighted region 925 is 77 microns. Based on this high standard deviation, this crown 900 can be rejected as a bad crown. In some embodiments, QC module 215 can reject any crown if the standard deviation of points in the differences model in any essential regions of a crown is above 20 microns. Essential regions of an anterior crown can be the mesial surface, the distal surface, and/or the lower portions of the buccal and lingual surfaces. QC module 215 can determine whether a crown is good based only the standard deviation of points on the mesial and distal surfaces of the differences model (or modified differences model).

Figure 10:
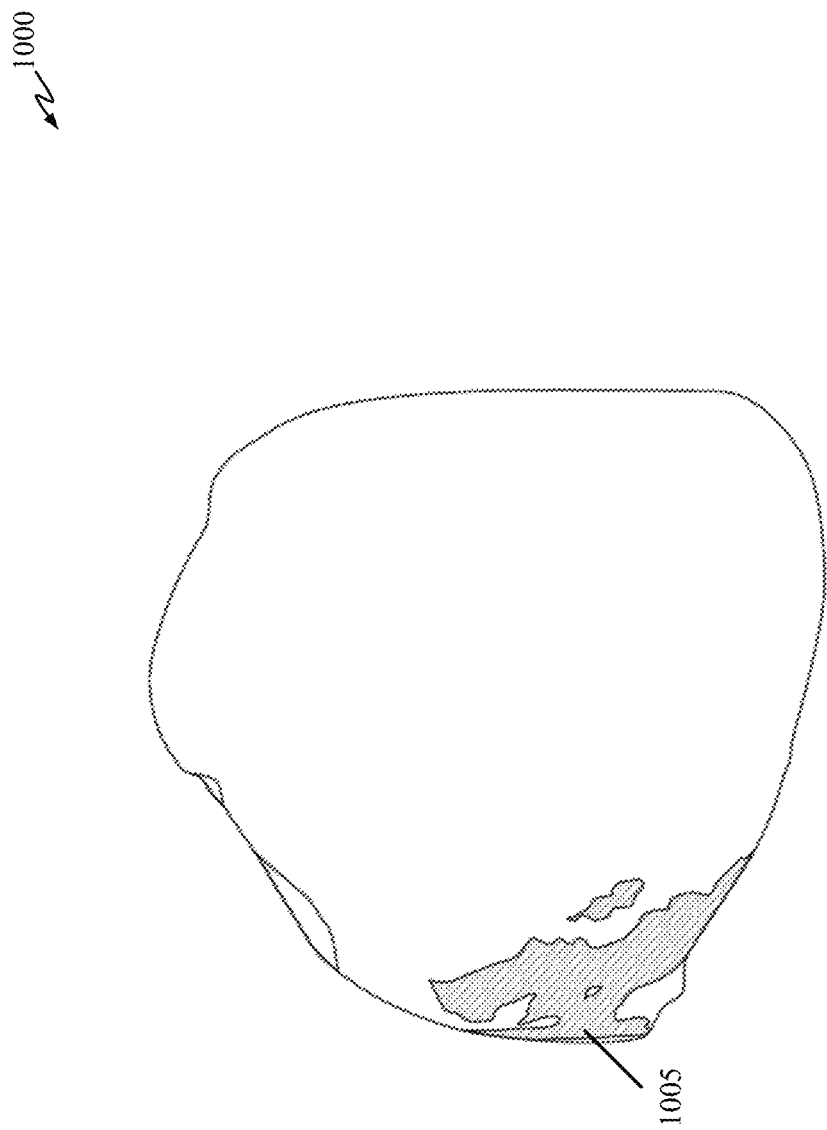

FIG. 10 illustrates a differences model of anterior crown 1000. Crowns 900 and 1000 are both manufactured from the same CAD file. As shown crown 1000 has much less variation as compared to crown 900. In this sample, the standard deviation of the mesial region 1005 is approximately 22 microns, which is still above the normal standard deviation threshold of 20 microns. It should be noted that the standard deviation threshold can be adjusted and can have a range between 10 to 30 microns. The source of the variations can be variability of enlargement factor within the material (e.g., milling stock) and/or incorrect calculation of the EF of the milling stock.

Figure 11:
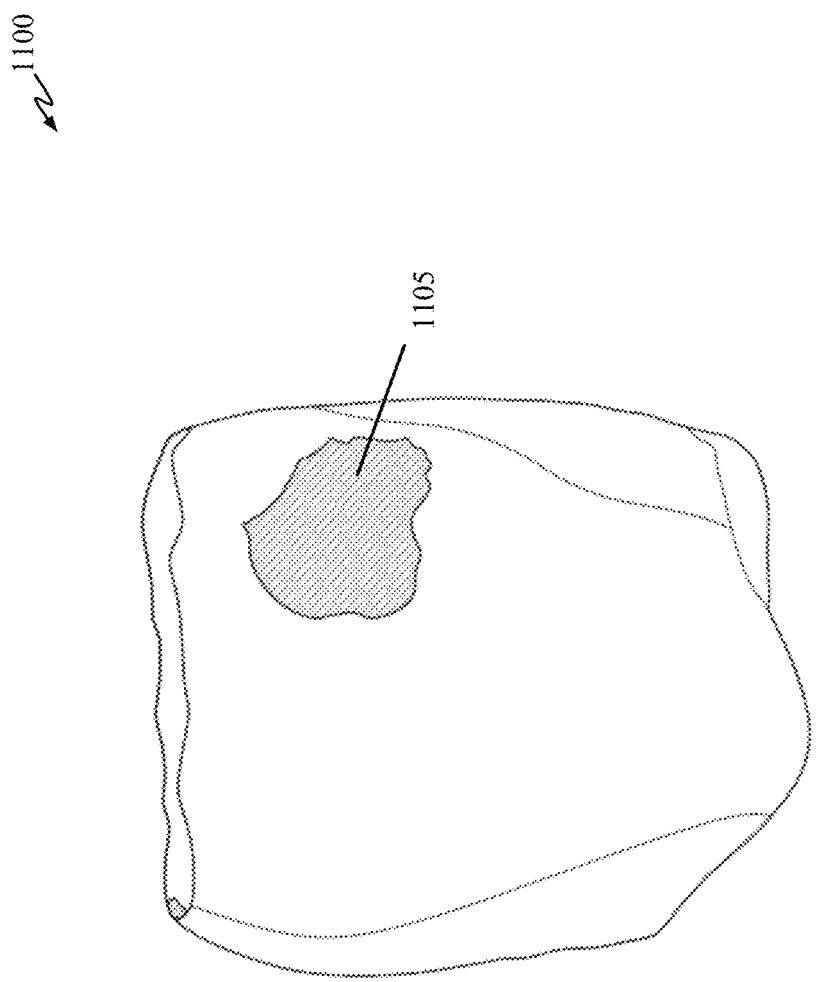

FIG. 11 illustrates a differences model of anterior crown 1100, which was produced from the same CAD file as crowns 900 and 1000. As revealed by statistical analysis on the differences model, anterior crown 1100 has a CAM defect at region 1105. This type of defects is typically very hard to spot via usual inspection. The standard deviation of the difference values (e.g., the difference value of points in the differences model) in region 1105 is 22 microns, which is practically impossible to perceive with the human eye. In some embodiments, the standard deviation threshold can be set at 20 microns, which means crown 1100 can be considered as a defective part.

Figure 12:
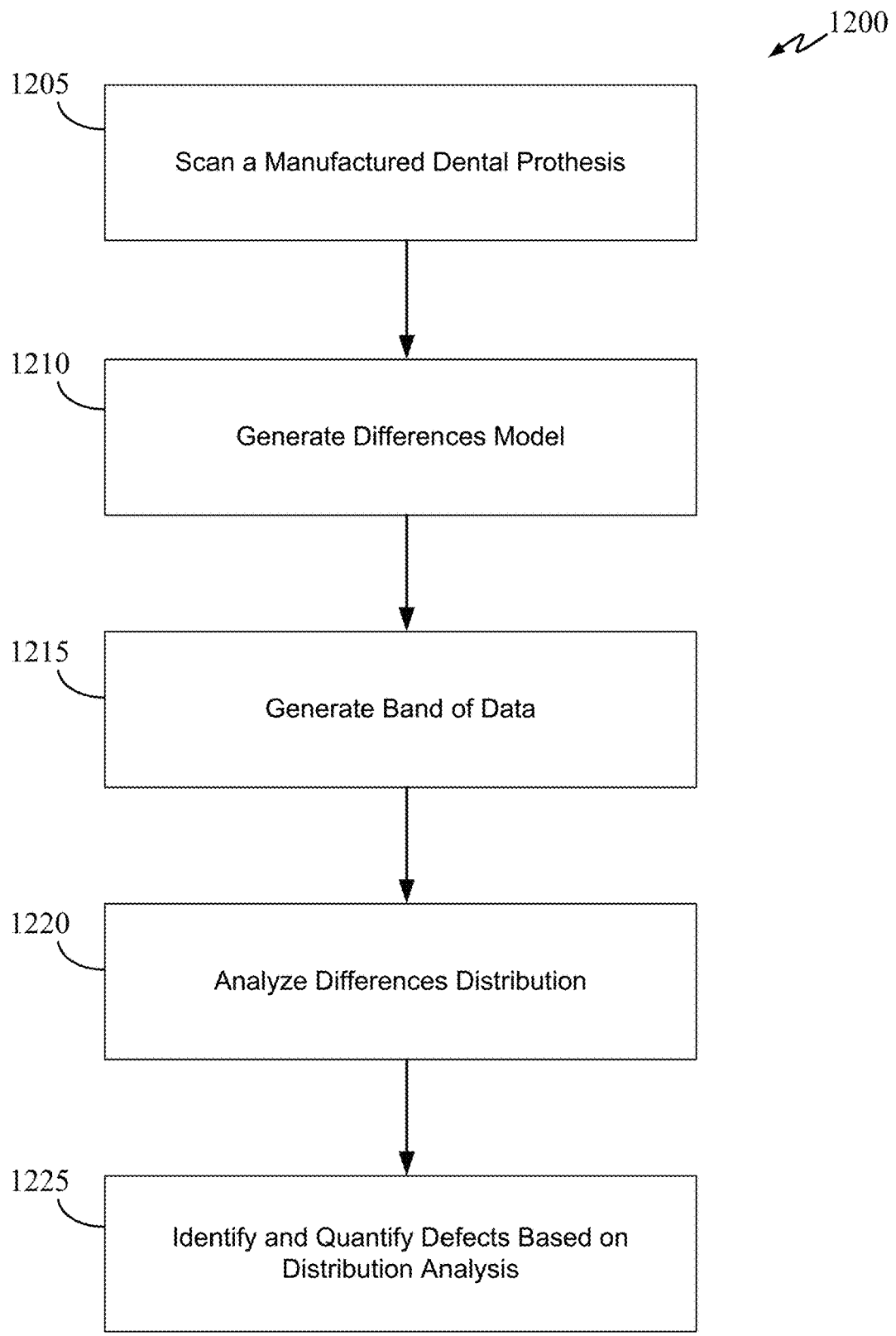
FIG. 12 is a flow diagram of a quality control process in accordance with some embodiments of the present disclosure.

FIG. 12 is a flow diagram of a quality control process 1200 in accordance with some embodiments of the present disclosure. Process 1200 starts at block 1205 where a manufactured dental prosthesis is scanned to generate a 3D data set. At block 1210 a differences (offsets) model is generated by best fitting the scanned 3D data set of the manufactured dental prosthesis with a CAD data set of the same. A differences model is a collection of offset data between points in the CAD model and corresponding best-fitting points in the scanned 3D data set. An ideal differences model comprises of zero offset points.

Figure 13:
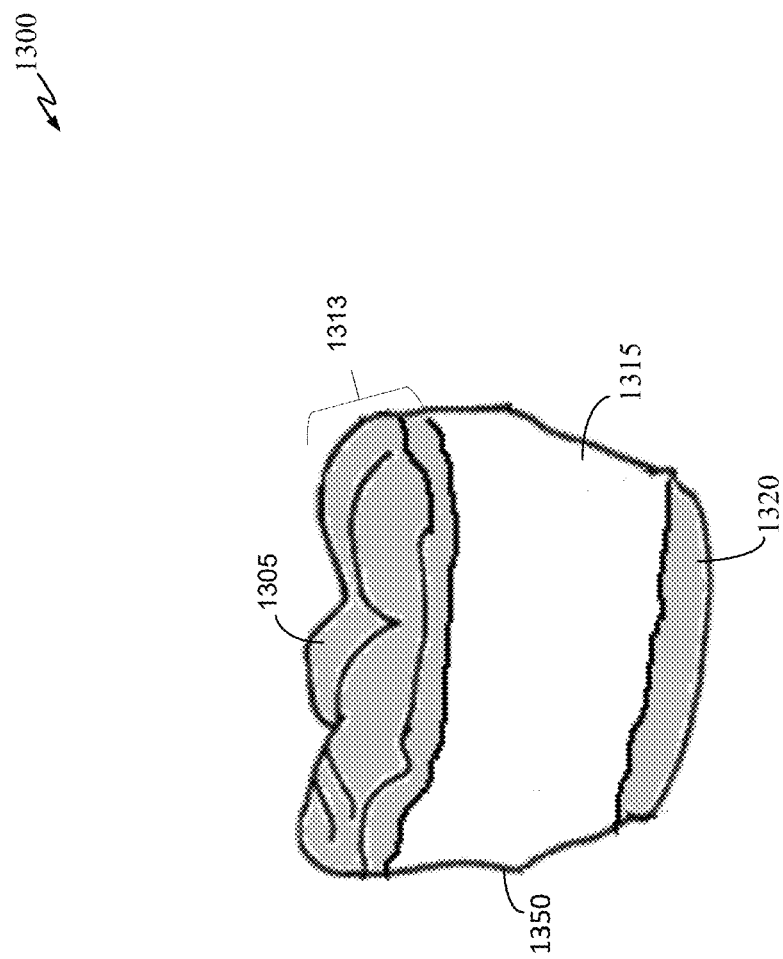
FIG. 13 illustrates a dental crown and a reliable data band in accordance with some embodiments of the present disclosure.

At block 1215, a band of data is generated prior to performing statistical analysis on the distribution of differences of the differences model or data set. The band of data is generated by eliminating a top and/or a bottom portion of the differences model from the statistical analysis. FIG. 13 illustrates a differences model of a crown 1300 having the band of data in accordance with some embodiments of the present disclosure. Crown 1300 includes an occlusal surface 1305, a top portion 1310, a middle portion 1315, and a bottom portion 1320. To generate a band of data 1350 that can be reliably used for statistical analysis, points located in top portion 1310 can be eliminated from the data set for statistical analysis. In some embodiments, points located in both top portion 1310 and bottom portion 1320 can be eliminated from the data set for analysis. Alternatively, only points in the top or bottom portion are eliminated from the data set. After the points in the top and bottom portions are removed (or simply not included in the analysis), band of data 1350 is generated. Band of data 1350 is reliable because it does not include variabilities inherent in occlusal surface 1305 and along the margin line (the bottom edge of bottom portion 1320). Additionally, a dental prosthesis can have a height tolerance of ±30 microns. Thus, by eliminating bottom portion 1320 from the statistical analysis, the height variation of the dental prosthesis is removed. This reduces the overall variability of the data set and thereby making it more reliable.

Referring again to FIG. 12, after the band of data is generated, the distribution of differences or offsets can be analyzed at block 1220. Empirical studies show that using only data from the modified differences model (e.g., data in band 1350) yield more accurate and consistent statistical results than using the entire differences data set of the generated differences model (at 1210).

At block 1225, various types of defect can be identified and quantified based on the analysis of the distribution of the differences data set. For example, crown 1000 can be classified as being too small if its differences distribution is negatively biased. Alternatively, crown 1000 can be classified as being too large if its differences distribution is positively biased. In another example, a step located in middle portion 1315 (see FIG. 13) can be identified if the distribution has two or more peaks. The step can also be quantified by analyzing where the distribution starts to increase on the left or right side of the distribution curve. For example, referring to FIGS. 6A and 6B, a step can be identified by the presence of peaks 610 and 615. Additionally, peaks 610 and 615 can be quantified by recognizing where in the distribution the percent distribution of points started to reverse and increase. In FIG. 6B, the point of percentage reversal for peak 610 occurs at 196 microns. Accordingly, the step can be quantified to have a height of approximately 200 microns.

Referring again to FIG. 2, modeling module 210 can contain codes, instructions, and algorithms which when executed by a processor will cause the processor to perform one or more functions described in process 1200 such as, but not limited to: perform a best fit of the CAD model of a dental prosthesis and a scanned 3D model of the same dental prosthesis (see block 1210 of FIG. 12); and to generate a differences model based on the best fit (see also block 1210).

QC module 215 can contain codes, instructions, and algorithms which when executed by a processor will cause the processor to perform a best fit of the CAD model of a dental prosthesis and a CNC or 3D printing simulated model.

QC module 215 can contain codes, instructions, and algorithms which when executed by a processor will cause the processor to perform one or more functions described in process 1200 such as, but not limited to: generate a modified differences model (e.g., band of data 1350); analyze differences distribution (e.g., data distribution of modified differences model), and identify and quantify defects based on distribution analysis.

Figure 14:
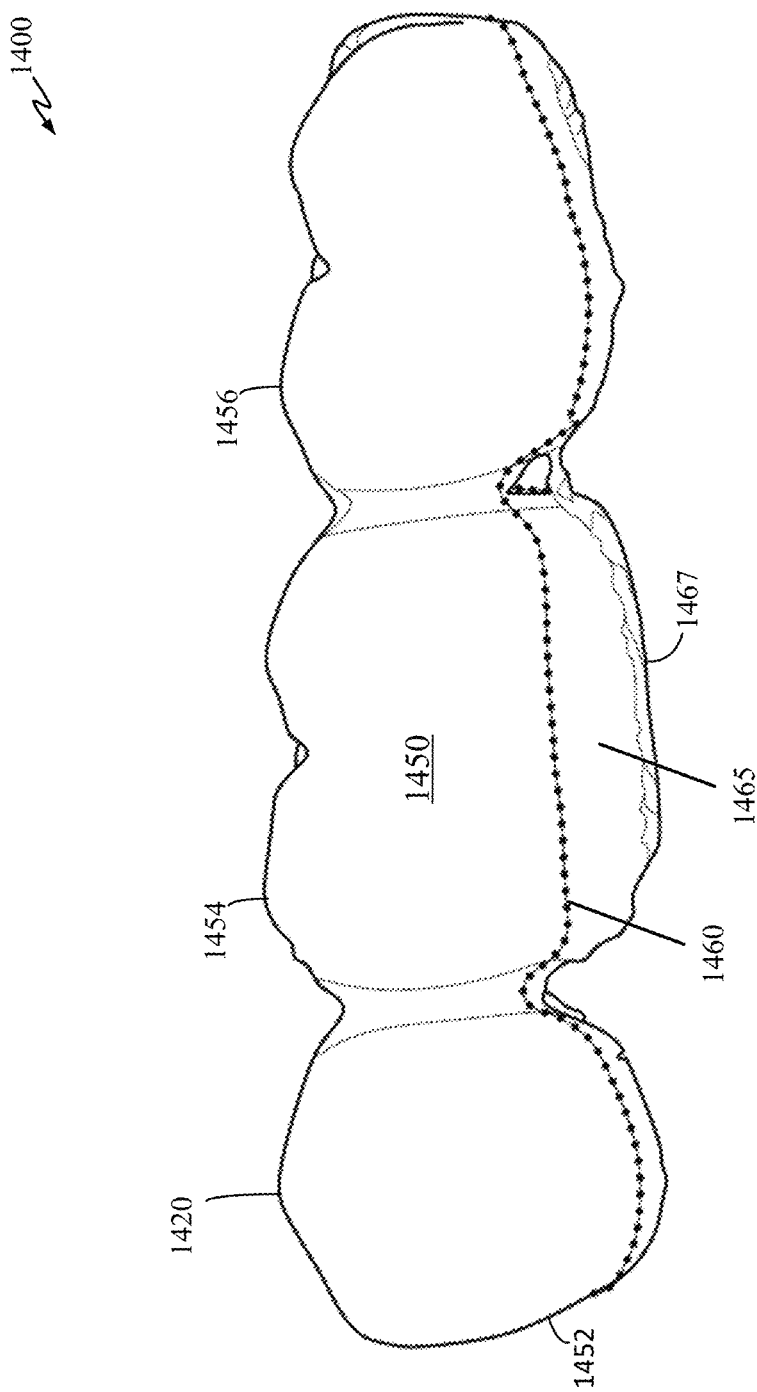
FIG. 14 is a side view of a differences model of a dental bridge with a proposed margin line generated in accordance with some embodiments of the present disclosure.
Figure 15:
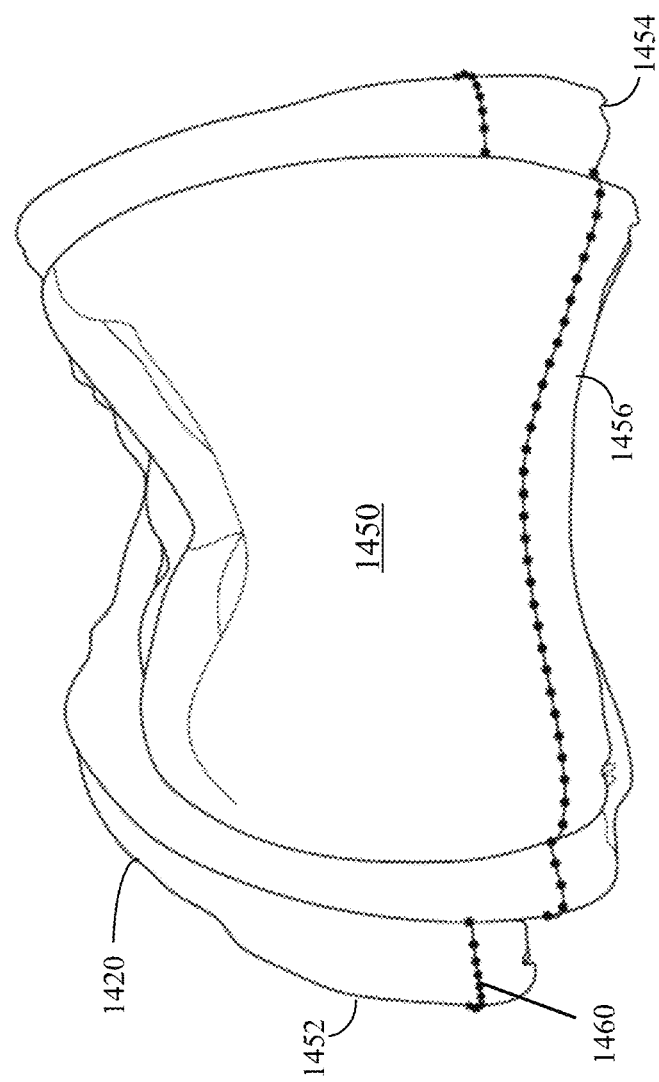
FIG. 15 is a front view of the differences model shown in FIG. 14.

FIGS. 14-18 graphically illustrate a process 1400 for generating a modified differences model in accordance with some embodiments of the present disclosure. FIGS. 14-18 will be discussed concurrently. FIG. 14 is a side view of a 3D differences model 1420 of a bridge 1450, which comprises teeth 1452, 1454, and 1456. Process 1400 can start by defining margin line 1460 of bridge 1450. Margin line 1460 can be manually determined or can be automatically proposed by the computer (e.g., QC module 215) based on at least the percentage distance of the total height of the tooth away from the bottom of the tooth. In other words, if the overall height of a tooth at a certain location is 20 mm, the margin can be set at 15% of the overall height at that location. This translates to a margin point being located at 3 mm away from the base (e.g., bottom) of the tooth. In some embodiments, the margin line can be 5-25% of the overall height of the tooth. Once margin line 1460 is defined, margin surface 1465 can be omitted from differences model 1420. Margin surface 1465 can be defined the surface between margin line 1460 and bottom perimeter 1467 of bridge 1450. FIG. 15 illustrate the front view of differences model 1420. Using a GUI, a user can rotate the view to any angle and can manually adjust any point of the proposed margin line 1460.

Figure 16:
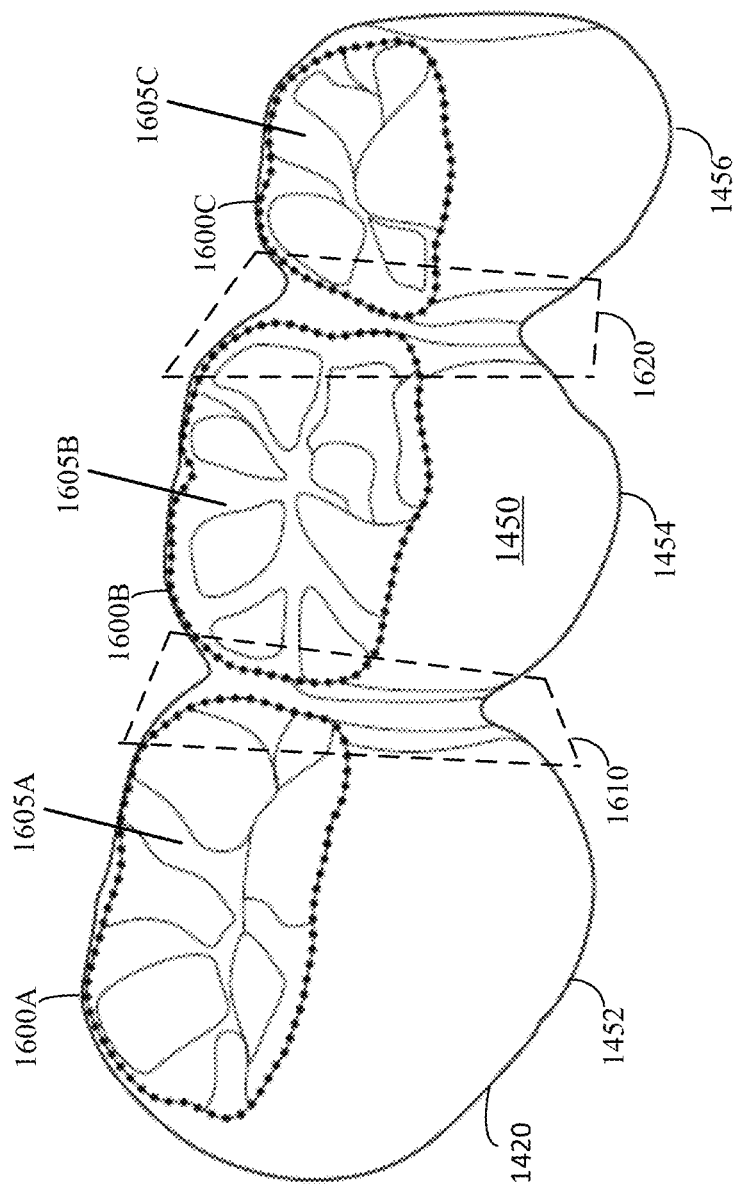
FIG. 16 is a perspective view of the differences model shown in FIG. 14 with proposed occlusal surface boundaries generated in accordance with some embodiments of the present disclosure.

FIG. 16 illustrates the occlusal surface boundaries 1600A-C of bridge 1450 generated in accordance with process 1400. Occlusal surface boundaries 1600A, 1600B, and 1600C can be manually generated or can be automatically generated by QC module 215. Similar to margin line 1460, a user can use a GUI to change the angle of view and adjust any point of occlusal surface boundaries 1600A-C. All data points within occlusal surface boundaries 1600A-C can be omitted from the differences model to generate a modified differences model. In other words, surfaces 1605A-C can be omitted from differences model 1420. In this way, any variabilities in the occlusal surface cannot affect the statistical analysis of bridge 1450, which can cause false negative rejection of the bridge. It should be noted that the order of defining margin line 1460 and occlusal surface boundary 1600 can be revered as the exact order is not important.

In some embodiments, process 1400 can omit all data points of surfaces in-between any two teeth of the bridge. For example, in bridge 1450, in-between surfaces inside of bounding boxes 1610 and 1620 can be omitted from the differences model to generate a modified differences model. Bounding box 1610 defines one or more surfaces in between teeth 1452 and 1454. Bounding box 1620 defines one or more surfaces in between teeth 1454 and 1456. QC module 215 can automatic select the one or more surfaces in bounding boxes 1610 and 1620 for omission. Using a GUI, a user can accept, decline, or modified the proposed surfaces for omission.

Figure 17:
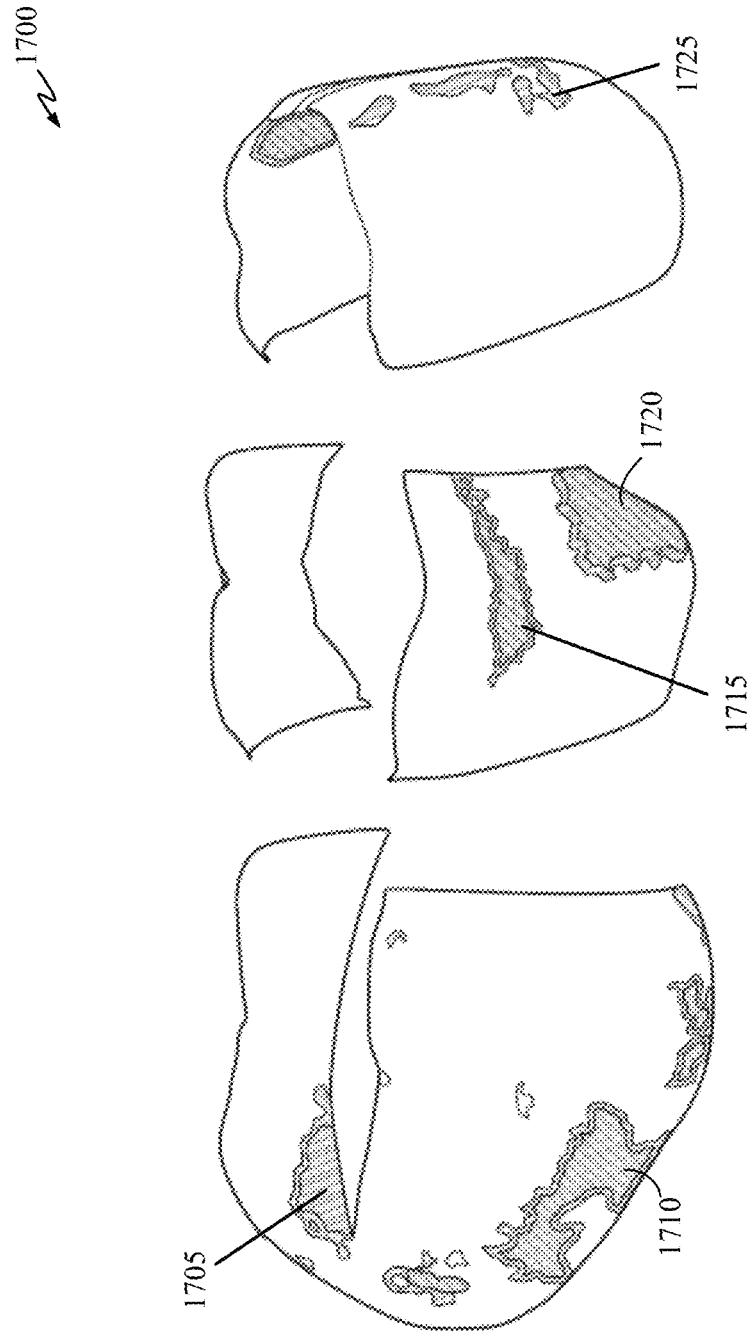
FIG. 17 illustrates a modified differences model with surfaces in-between two neighboring teeth being omitted in accordance with some embodiments of the present disclosure.

FIG. 17 illustrates a modified differences model 1700 having a plurality of surfaces omitted from differences model 1420. As shown in FIG. 17, margin surface 1465, occlusal surfaces 1605A-C, and surfaces within bounding boxes 1610 and 1620 have been omitted from differences model 1420. This creates a modified data set (e.g., band of data) that can be reliably used to perform statistical analysis. The modified data set is reliable because regions of high variabilities (e.g., occlusal surfaces) are omitted from the statistical analyses. After statistical analysis, regions 1705-1725 each has a standard deviation higher than 20 microns. In FIG. 17, areas with more intense shading have higher variability than areas with lighter shading.

Figure 18:
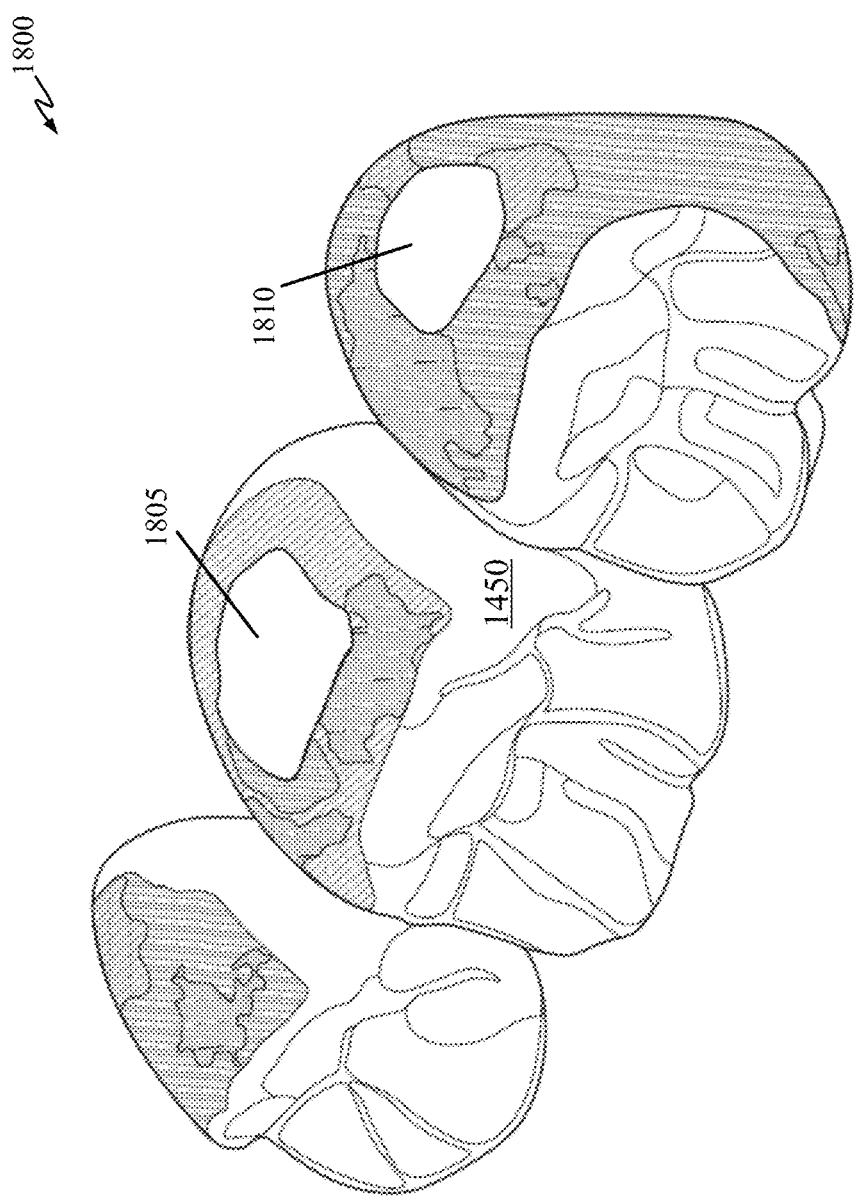
FIG. 18 illustrates a modified differences model with sprue areas being omitted in accordance with some embodiments of the present disclosure.

FIG. 18 is a perspective view of a modified differences model 1800 having sprue areas 1805 and 1810 being omitted from the original differences model 1420. A sprue area is a location on the surface of a tooth where a support material connects bridge 1450 to the milling block (not shown). Typically, a bridge has three or more sprues to secure the bridge to the milling block. As previously mentioned, sprue areas can be highly variable because the sprues are broken off manually when the bridge is removed from the milling block. Next, the sprue areas are manually sanded and smoothened for glazing. Accordingly, process 1400 can remove sprue areas 1805 and 1810 to further increase the reliability of the modified differences model for statistical analysis.

FIGS. 19A-D are bar charts illustrating distribution of data points of modified differences models in accordance with some embodiments of the present disclosure. FIGS. 19A-D also illustrate various failure modes of a bridge.

Figure 19A:
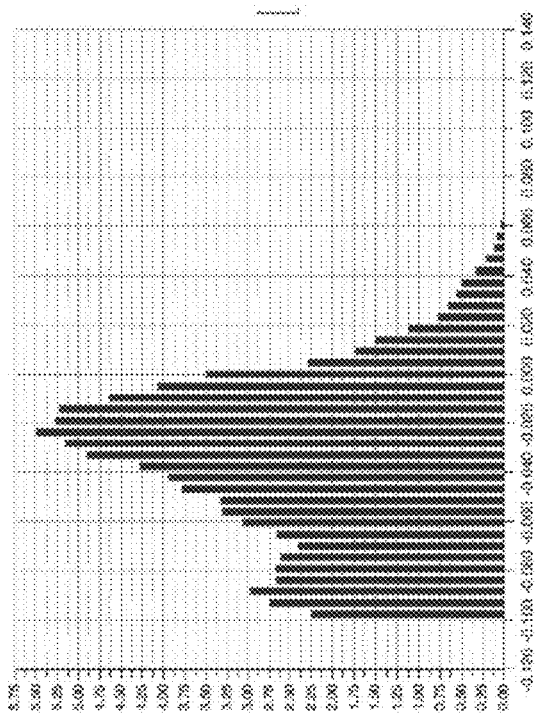
FIGS. 19A-D are example graphs illustrating the offsets distribution of differences models in accordance with some embodiments of the present disclosure.

Referring to FIG. 19A, QC module 215 can fail the bridge of this example differences model because of low EF (enlargement factor) as indicated by the shift in distribution in the negative direction and the two peaks. Additionally, the standard deviation of this distribution is 40 microns.

Figure 19B:
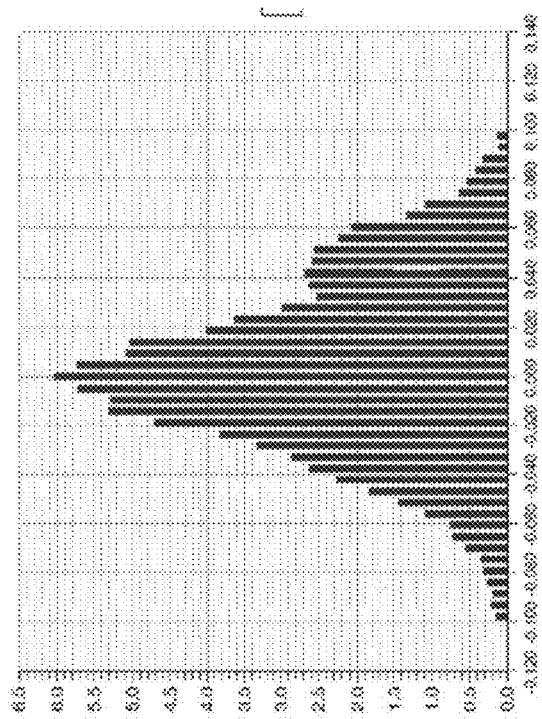

In FIG. 19B, this sample fails quality control because the distribution of this example differences model has two peaks and has a standard deviation of 39 microns. The second peak is biased on the positive side—indicating a high EF.

Figure 19D:
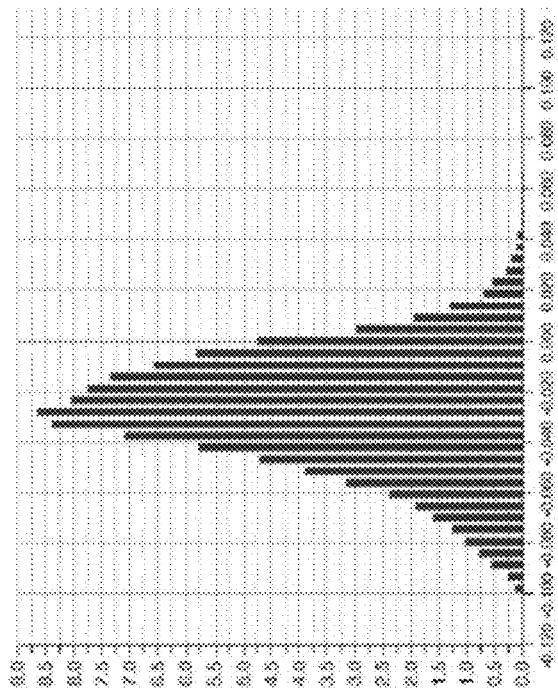
Figure 19C:
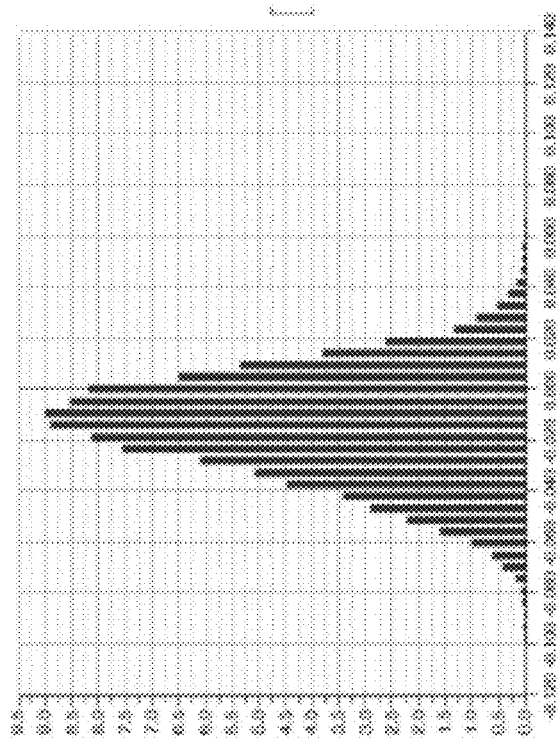

FIG. 19C illustrates a slight shift in the distribution curve toward the negative direction with as standard deviation of 21 microns. This sample is borderline good but can be rejected due to the slight shift in the distribution toward the negative and a slightly high standard deviation.

Similar to FIG. 19C, FIG. 19D represent a distribution with a negative shift but is more pronounced than FIG. 19C. The standard deviation of the distribution of FIG. 19D is 23 microns. Accordingly, QC module 215 can mark this sample as failed because the standard deviation is higher than 20 microns.

Prosthesis Fixtures

Figure 20:
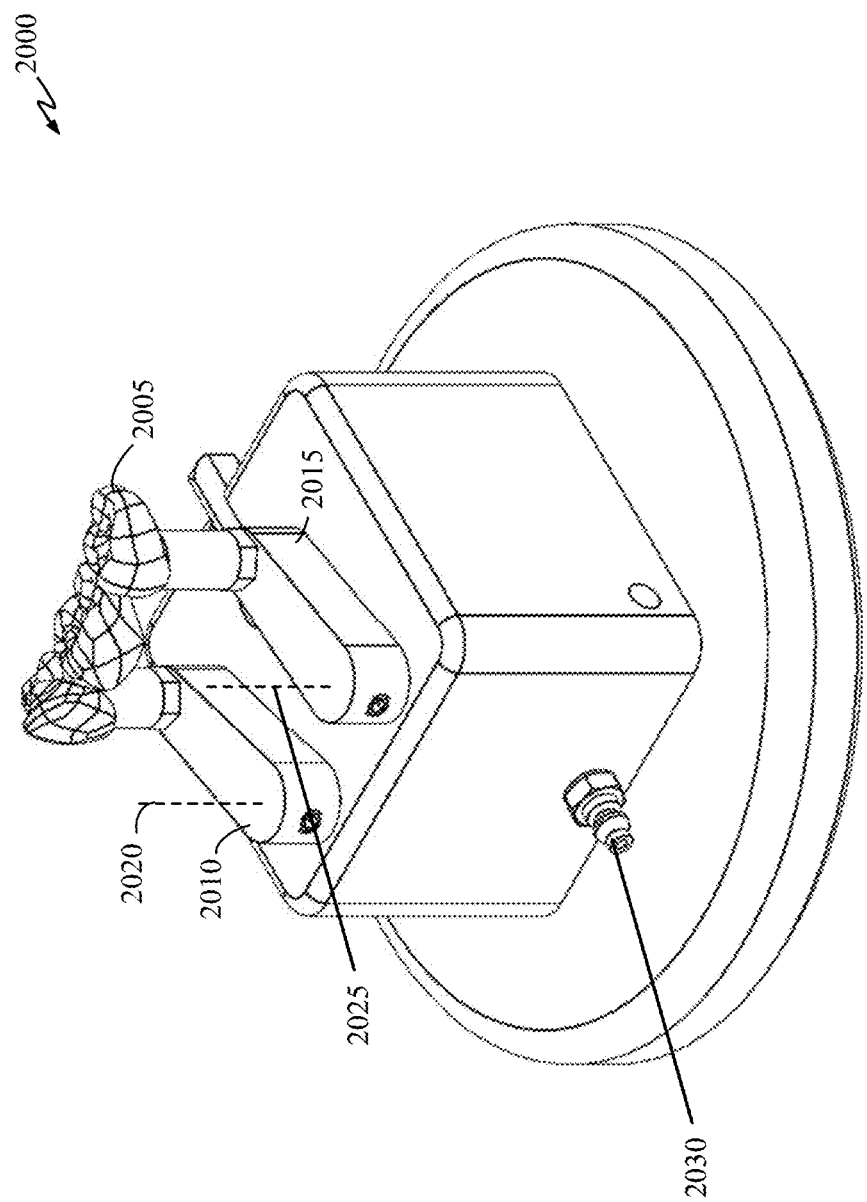
FIGS. 20, 21, 22A, and 22B are perspective view of a dental prosthesis fixture in accordance with some embodiments of the present disclosure.

FIG. 20 is a perspective view of a fixture 2000 for securing a dental prosthesis 2005 during the scanning process, which requires prosthesis 2005 to be completely secured and stationary while the scanning takes place. Fixture 2000 employs two vacuum-assisted holders (hidden from view under prosthesis 2005) to securely hold prosthesis 2005. Each holder is located at the distal end of swingable arms 2010 and 2015. Arm 2010 is pivotable about axis 2020, and arm 2015 is pivotable about axis 2025. Both arms 2010 and 2015 can be pivoted inward (toward each other) or outward (away from each other). The pivotable motion allows the holder at the distal end of the arm to apply a constant pressure against the internal cavity (not shown) of prosthesis 2005, which helps keep prosthesis 2005 stationary.

Fixture 2000 also includes an adaptor (e.g., inlet valve) 2030 to receive an air hose, which is connected to a motor that generates a vacuum at the holder at the end of each arm. The vacuum-assisted holders hold down prosthesis 2005 with air suction and at the same time applying a constant pressure against the side wall of an internal cavity of prosthesis 2005.

Figure 21:
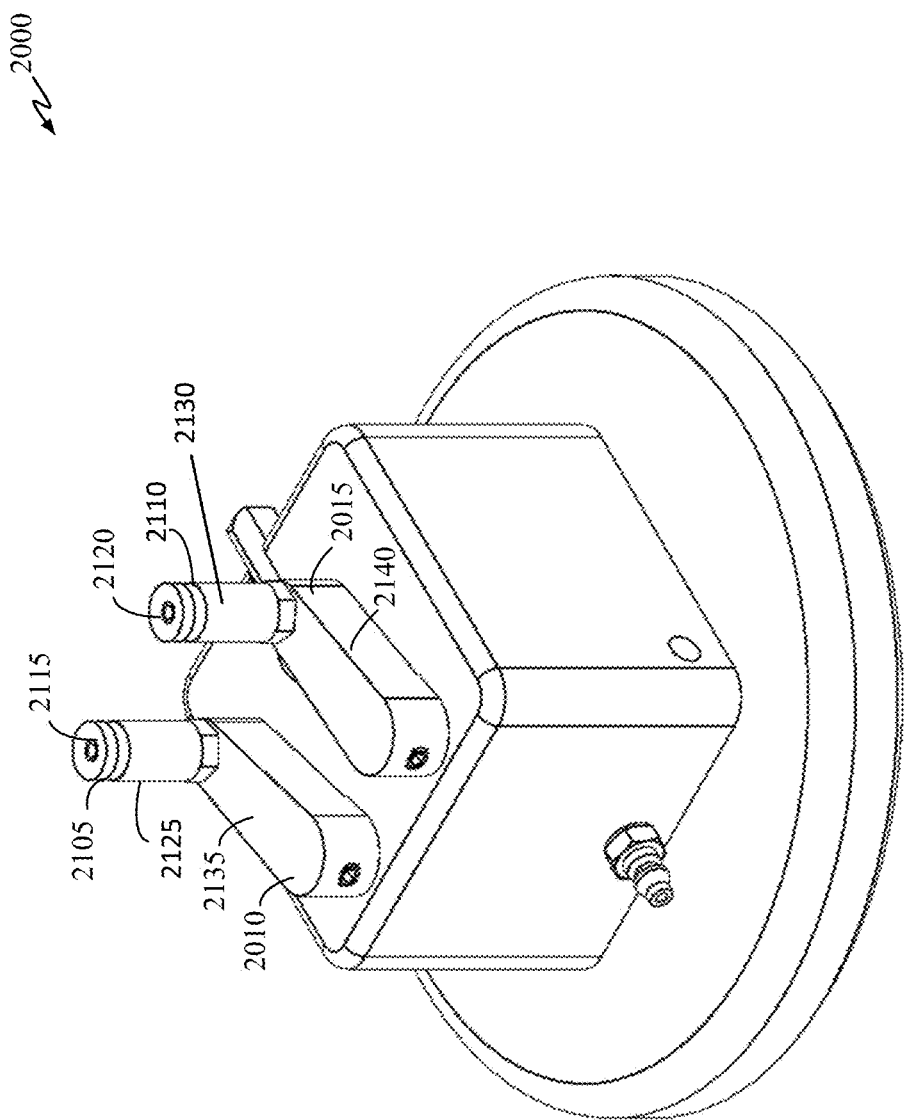

FIG. 21 illustrates fixture 2000 without prosthesis 2005 mounted on holders 2105 and 2110. Each of holders 2105 and 2110 includes an opening (i.e., 2115 and 2120) that extends to inlet valve 2030. Once the suction pump is activated, a vacuum is created at each of the openings 2115 and 2120.

As shown, arm 2010 includes a distal portion 2125, and arms 2015 includes a distal portion 2130. Although not shown, fixture 2000 includes internal channels (hidden) that connect inlet valve 2030 to openings 2115 and 2120. One of the internal channels can run along distal portion 2125 and horizontal proximal portion 2135 of arm 2010. Similarly, a second internal channel can run along distal portion 2130 and horizontal proximal portion 2140 of arm 2015.

Figure 22B:
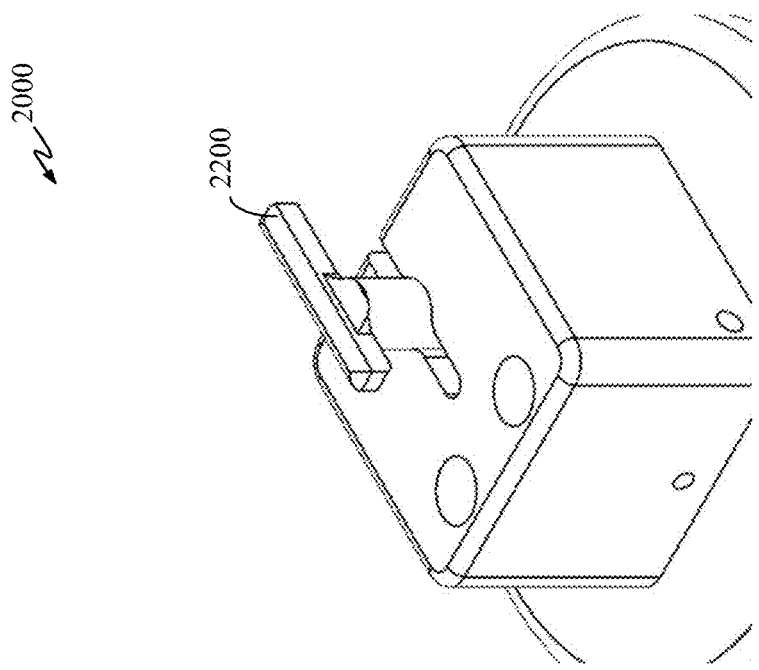
Figure 22A:
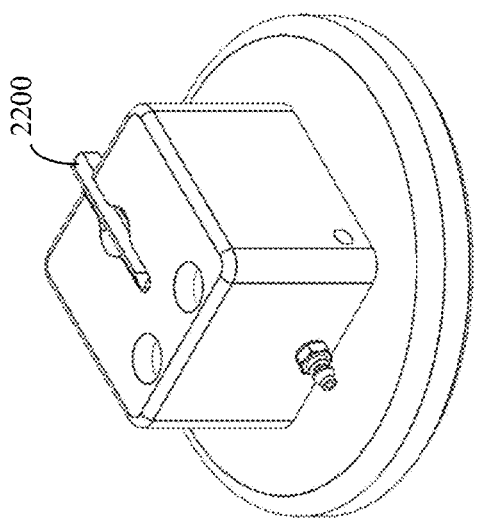

FIGS. 22A and 22B are perspective views of fixture 2000 with several components being hidden so that support arm 2200 can clearly be shown. Support arm 2200 can be raised (see FIG. 22B) so that it engages the bottom of prosthesis 2005 to provide support if needed. For certain bridge, the size of the bridge can be long (e.g., a full upper dental prosthesis) such that support is needed to provide additional stability. The height of support arm 2200 can be adjusted and can secured in place using a spring, a stop screw, friction fitting, etc.

Figure 23:
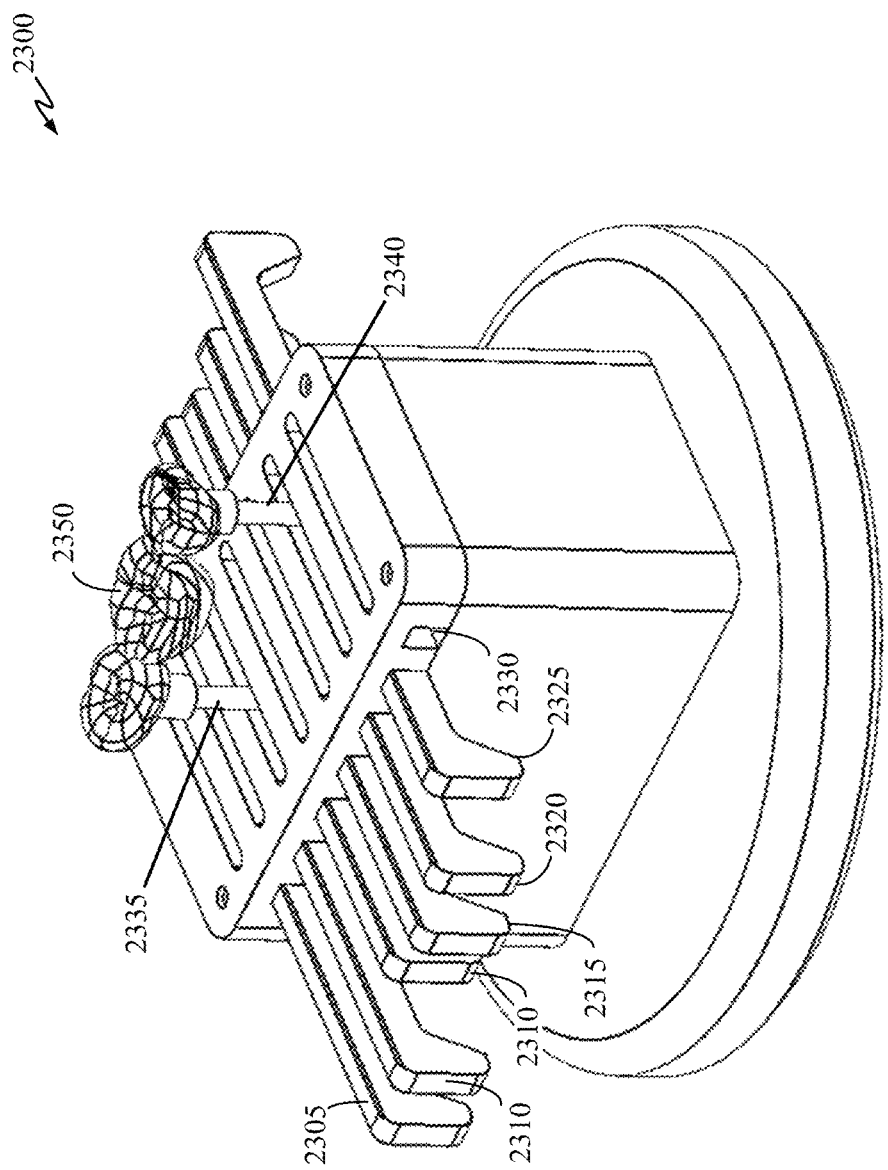
FIG. 23 is perspective view of another dental prosthesis fixture in accordance with some embodiments of the present disclosure

FIG. 23 is a perspective view of another fixture 2300 in accordance with some embodiments of the present disclosure. Fixture 2300 includes a plurality of push bars 2305, 2310, 2315, 2320, and 2325. Each push bar is slidably disposed in a slot (e.g., slot 2330) of fixture 2300, which has a total of seven slots. Each push bar includes a hole (not shown) in which a support post (e.g., post 2335, 2340) can be placed. The location of support posts 2335 and 2340 depend on the size and width of the dental prosthesis. For a wide dental prosthesis, post 2335 and 2340 would have to be placed farther apart. For example, post 2335 can be secured to a hole of push bar 2305, thereby creating a wider support distance between posts 2335 and 2340. Dental prosthesis 2350 can be secured into place using pressure being applied by posts 2335 and 2340. Each post can have a holder (hidden under dental prosthesis 2350) with a sticky substance to grip the internal cavity of dental prosthesis 2350. The holder can be sized to have a tight fit within the internal cavity of dental prosthesis 2350. To securely hold dental prosthesis 2350 in place, post 2335 can be configured to apply pressure to the internal cavity wall of dental prosthesis 2350 in a first direction, and post 2340 can be configured to apply pressure to the internal cavity wall of dental prosthesis 2350 in a second (and opposite) direction. In this way, prosthesis 2350 can be securely held.

Figure 24:
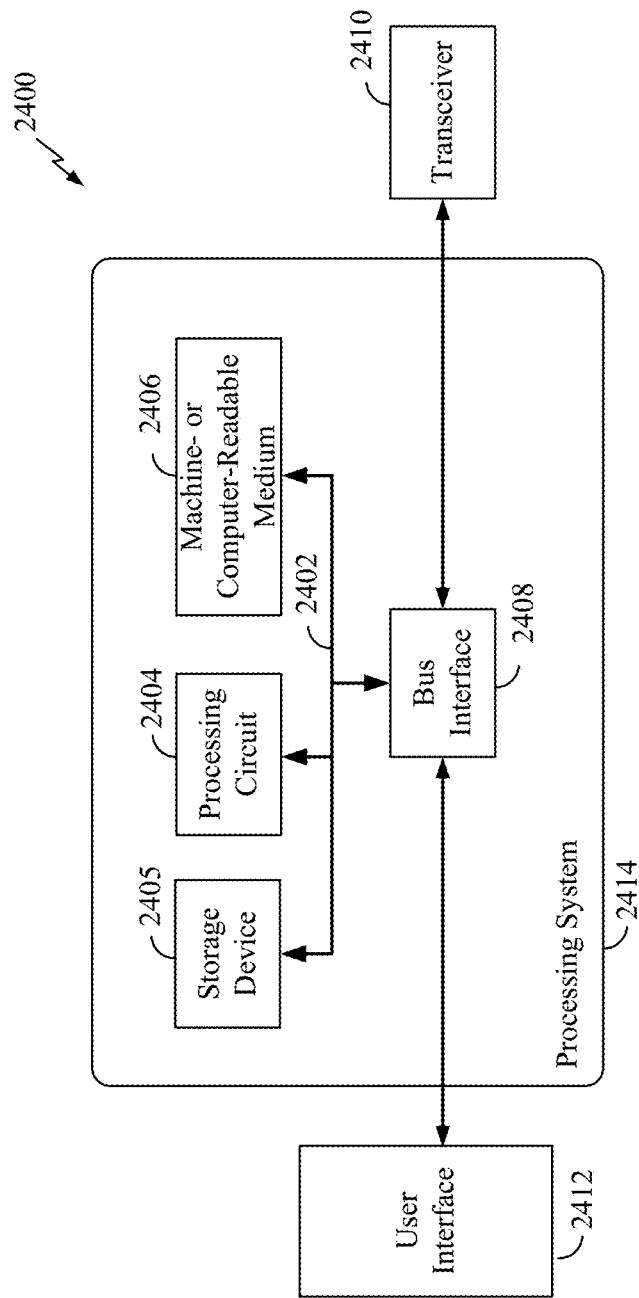
FIG. 24 is a system diagram that can be used to implement the system and method for performing quality control in accordance with some embodiments of the present disclosure.

FIG. 24 illustrates an overall system or apparatus 2400 in which modules 210 and 215 and process 1200 can be implemented. In accordance with various aspects of the disclosure, an element, or any portion of an element, or any combination of elements may be implemented with a processing system 2414 that includes one or more processing circuits 2404. Processing circuits 2404 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 2404 may be used to implement any one or more of the processes described above and illustrated in FIGS. 4 through 12.

In the example of FIG. 24, the processing system 2414 may be implemented with a bus architecture, represented generally by the bus 2402. The bus 2402 may include any number of interconnecting buses and bridges depending on the specific application of the processing system 2414 and the overall design constraints. The bus 2402 links various circuits including one or more processing circuits (represented generally by the processing circuit 2404), the storage device 2405, and a machine-readable, processor-readable, processing circuit-readable or computer-readable media (represented generally by a non-transitory machine-readable medium 2406.) The bus 2402 may also link various other circuits such as timing sources, peripherals, voltage regulators, and power management circuits, which are well known in the art, and therefore, will not be described any further. The bus interface 2408 provides an interface between bus 2402 and a transceiver 2410. The transceiver 2410 provides a means for communicating with various other apparatus over a transmission medium. Depending upon the nature of the apparatus, a user interface 2412 (e.g., keypad, display, speaker, microphone, touchscreen, motion sensor) may also be provided.

The processing circuit 2404 is responsible for managing the bus 2402 and for general processing, including the execution of software stored on the machine-readable medium 2406. The software, when executed by processing circuit 2404, causes processing system 2414 to perform the various functions described herein for any particular apparatus. Machine-readable medium 2406 may also be used for storing data that is manipulated by processing circuit 2404 when executing software.

One or more processing circuits 2404 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 2406. The machine-readable medium 2406 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 2406 may reside in the processing system 2414, external to the processing system 2414, or distributed across multiple entities including the processing system 2414. The machine-readable medium 2406 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for performing quality control on a dental prosthesis manufacturing system, the method comprising:
    providing a computer-aided design (CAD) model of a dental prosthesis;
    manufacturing a physical dental prosthesis based on the CAD model;
    scanning the physical dental prosthesis to create a 3D scan model;
    generating a differences model by comparing the CAD model with the 3D scan model and compiling offsets between portions of a data set of the CAD model and corresponding portions of a data set of the 3D scan model;
    modifying the differences model by omitting from the differences model portions of the data set corresponding to an occlusal surface of the dental prosthesis; and
    analyzing the differences model to determine whether the dental prosthesis manufacturing system is operating within a predetermined tolerance threshold.

2. The method of claim 1, further comprising modifying the differences model by omitting from the differences model portions of the data set corresponding to a bottom portion near a margin line of the dental prosthesis.

3. The method of claim 1, wherein the CAD model comprises a computer generated design model of the dental prosthesis based upon patient-specific data.

4. The method of claim 1, wherein the CAD model comprises a computer generated design model based upon a simulation of a manufacturing process for the dental prosthesis.

5. The method of claim 4, wherein the simulated manufacturing process comprises a simulated CNC milling or 3D printing process.

6. The method of claim 1, wherein analyzing the differences model comprises performing a statistical analysis on the differences model.

7. The method of claim 1, wherein analyzing the differences model comprises determining a standard deviation of offset values of points of the differences model.

8. The method of claim 1, further comprising determining that the manufactured dental prosthesis is too small or too large based on a distribution of offsets that is negatively or positively biased as compared to a normal distribution.

9. The method of claim 1, further comprising determining that the manufactured dental prosthesis has a manufacturing defect when a distribution of offsets includes peaks at a left and right side of a normal distribution curve.

10. The method of claim 1, further comprising shutting down one or more prosthetic manufacturing machineries based on a result of analyzing the differences model to determine whether the dental prosthesis manufacturing system is operating within the predetermined tolerance threshold.

11. The method of claim 1, further comprising accepting the manufactured dental prosthesis as a good product based on a result of analyzing the differences model to determine whether the dental prosthesis manufacturing system is operating within the predetermined tolerance threshold.

12. The method of claim 1, further comprising rejecting the manufactured dental prosthesis as a defective product based on a result of analyzing the differences model to determine whether the dental prosthesis manufacturing system is operating within the predetermined tolerance threshold.

13. The method of claim 1, further comprising:
determining whether the manufactured dental prosthesis is too small or too large based on whether a distribution of offsets is negatively or positively biased as compared to a normal distribution;
determining whether the manufactured dental prosthesis has a manufacturing defect based on whether the distribution of offsets includes peaks at a left or right side of a normal distribution curve; and
shutting down one or more prosthetic manufacturing machineries based at least on whether the manufactured dental prosthesis is too small, too large, or has a manufacturing defect.

* * * * *